United States Patent [19]
Angelle

[11] Patent Number: 6,096,228
[45] Date of Patent: *Aug. 1, 2000

[54] APPARATUS AND METHOD FOR HANDLING WASTE-C-I-P II

[76] Inventor: Clinton J. Angelle, 1584 Grand Anse Hwy., Breaux Bridge, La. 70517

[ * ] Notice: This patent is subject to a terminal disclaimer.

[21] Appl. No.: 09/118,047

[22] Filed: Jul. 17, 1998

Related U.S. Application Data

[63] Continuation-in-part of application No. 08/844,938, Apr. 23, 1997, Pat. No. 5,846,440, which is a continuation-in-part of application No. 08/570,910, Dec. 12, 1995, Pat. No. 5,662,807.

[51] Int. Cl.[7] .................................................. B01D 21/18
[52] U.S. Cl. ........................ 210/803; 210/524; 210/527
[58] Field of Search .................................. 210/744, 803, 210/104, 112, 524, 527, 532.1

[56] References Cited

U.S. PATENT DOCUMENTS

| | | | |
|---|---|---|---|
| 1,879,135 | 9/1932 | Downes et al. | 210/527 |
| 2,266,937 | 12/1941 | Tark | 210/524 |
| 3,396,102 | 8/1968 | Forrest | 210/527 |
| 3,410,412 | 11/1968 | Fechter | 210/527 |
| 3,807,560 | 4/1974 | Pentz et al. | 210/83 |
| 3,822,788 | 7/1974 | Dunkers et al. | 210/527 |
| 4,776,960 | 10/1988 | Cerroni | 210/527 |
| 5,490,920 | 2/1996 | Fruchtbaum et al. | 210/527 |

FOREIGN PATENT DOCUMENTS

| | | | |
|---|---|---|---|
| 2406858 | 8/1975 | Germany | 210/527 |
| 537309 | 6/1941 | United Kingdom | 210/527 |

*Primary Examiner*—Christopher Upton
*Attorney, Agent, or Firm*—Domingue & Waddell, PLC

[57] ABSTRACT

An apparatus for handing a waste material is disclosed. Generally, the apparatus comprises a pump mounted within a container. The container has disposed thereon a rail member. The apparatus also contains a trolley mounted on the rail. The trolley has operatively associated therewith a handling system that has attached thereto the pump. The pump has an impeller assembly that pumps the waste material from the container. The impeller assembly contains a first and second rotor blade. A process device may be included that is attached to the handling system. A process for handling a discharged waste slurry is also disclosed.

15 Claims, 15 Drawing Sheets

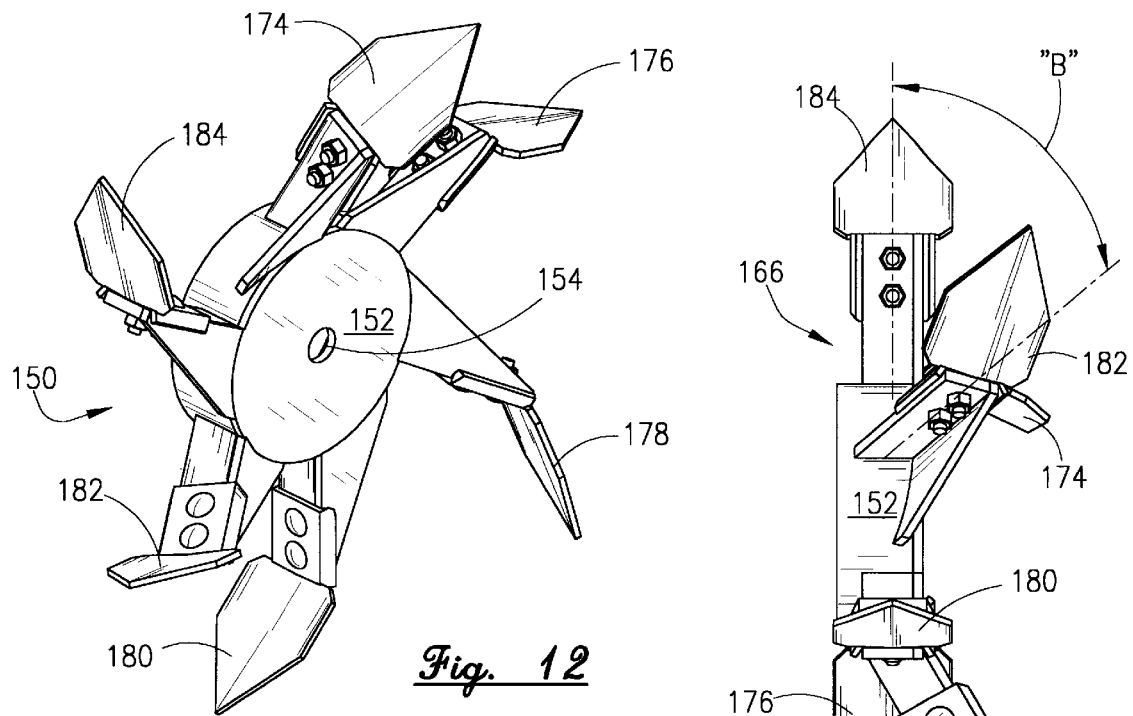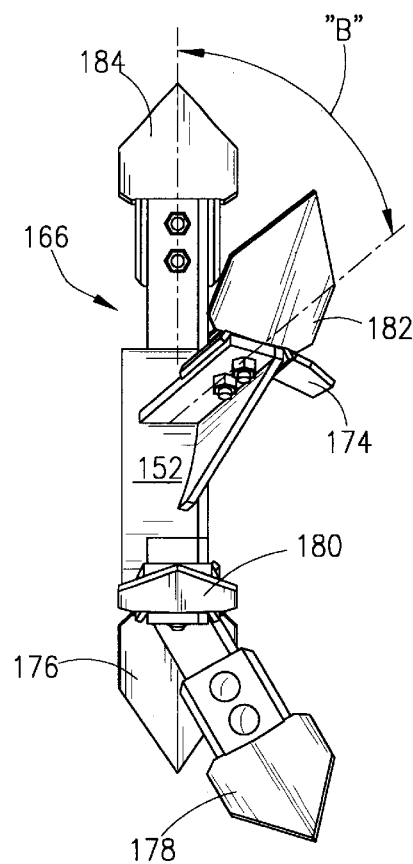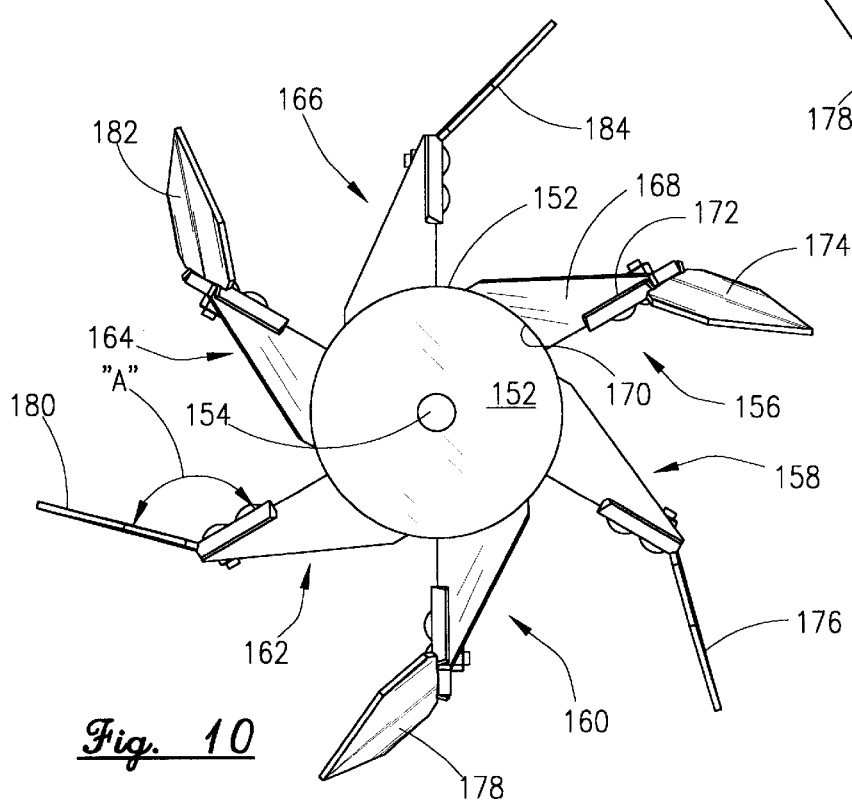
Fig. 12
Fig. 11
Fig. 10

APPARATUS AND METHOD FOR HANDLING WASTE-C-I-P II

This application is a continuation-in-part of application Ser. No. 08/844,938 filed on Apr. 23, 1997, now U.S. Pat. No. 5,846,440, which is a continuation in part of application Ser. No. 08/570,910, filed on Dec. 12, 1995, now U.S. Pat. No. 5,662,807.

BACKGROUND OF THE INVENTION

This invention relates to an apparatus and method for handling waste. More particularly, but not by way of limitation, this invention relates to a system for handling a discharge of waste in a safe and environmentally protected fashion.

The discharge of waste, particularly from the drilling of an oil and gas well for ultimate production, presents many environmental problems. For instance, when a well bore is drilled into the earth, the well may extend for many thousands of feet. During the drilling process, the well bore will be filled with a drilling fluid. The drilling fluid is necessary for several reasons including pressure control, and lubrication of the drill string.

Thus, the drilling fluid is an essential component of the drilling process. The physical and chemical composition of the drilling fluid will vary. However, many times the fluid contains hazardous materials such as oil. Also, the drilling fluid will contain solids which comprise rock and shale cuttings. The volumes thus discharged, coupled with the weight of the cuttings, is very significant.

An important number of environmental regulations pertaining to the removal, handling and treatment of this fluid has been promulgated over the years. The transferring of the drilling fluid from on-site holding tanks (also known as pits) to vehicles capable of hauling the waste creates the significant possibility of spillage. Thus, the handling of the drilling fluid so that the drilling fluid is disposed properly is a major issue for companies. Many types of prior art systems have been attempted to cure this problem, all with limited success. The invention herein disclosed solves these problems by disclosing a system and method of handling environmental waste in a safe and economical process. It should be noted that the invention herein disclosed is also applicable to other industries wherein the handling of waste for transportation to and from sites is necessary.

SUMMARY OF THE INVENTION

An apparatus for handling a waste material is disclosed. Generally, the apparatus comprises a container having disposed thereon a rail member. The apparatus also contains a car mounted on the rail. The car will have extending therefrom a first wiper that extends into the container. The apparatus may also contain an auger means, operatively mounted on the container, for removing the waste from the container.

In one embodiment, the wiper (also referred to as a shovel) comprises an elongated member having a first end and a second end, with the second end being pivotally mounted to the car. The apparatus may further comprise an oscillating means for oscillating the wiper. Also included will be transporting means for transporting the car via the rail from one end of the container to the other.

Generally, the waste contained within said container consist of a slurry comprising: a fluid; solids suspended in the fluid; and solids. The waste may be a discharged drilling fluid from a well bore. It should be noted, however, that the invention herein disclosed is applicable to other types of waste which contains fluids, solids suspended in fluid, and solids. The apparatus may further comprise pump means, operatively associated with the wiper, for pumping the fluid and solids suspended in the fluid from the container.

In another embodiment, the shovel comprises a first blade member attached to the elongated member at the first end, and a second blade member also attached to the elongated member at the first end. In this embodiment, the first blade member is positioned in a first direction relative to the container and the second blade member is positioned in a second direction relative to the container. Thus, waste can be shifted to one end of the container by the first blade member; alternatively, movement in the opposite direction will shift the waste to the opposite end of the container by the second blade.

A process for handling a discharged waste slurry is also disclosed. In the preferred embodiment, the waste slurry is a drilling fluid discharged from a drilled bore hole. The process includes placing the discharged waste slurry into a container. In this embodiment, the container contains: a rail; a trolley positioned on the rail; a pump means for pumping the discharged waste slurry from the container; a shovel means, operatively associated with the trolley, for shoveling the discharged waste slurry from a first position within said container to a second position within the container.

The process further includes transporting the trolley from a first position to a second position. The pump means can pump the discharged waste slurry from the container. In one embodiment, the shovel means contains an elongated member capable of pivoting. The process further comprises pivoting the shovel means in a swinging fashion, and thereafter, stirring the discharged waste slurry. The pump means can withdraw the waste slurry from the container so that the container is emptied.

The process may further comprise the steps of terminating the pumping, and thereby allowing the waste to separate into a mostly fluid phase and a solid phase. Thereafter, the operator would adjust the physical level of the pump means so that the pump coincides with the level of the fluid phase. Next, the operator would pump the waste from the container.

The process may also include transporting the trolley from a first position to a second position on the rail. Thus, the shovel means would push the solids to the second position within the container. The container may further include an auger positioned at the second position. Therefore, the process further comprises the steps of removing the solids from the container with the aid of the auger.

A second embodiment of the present invention, which is the preferred embodiment of this application, is also disclosed. This second embodiment includes a system for handling waste material comprising a tank containing the waste material and a reciprocating carriage operatively associated with the tank. The reciprocating carriage will have a handling member adapted thereto, with a pump means, operatively associated with the handling member, for pumping the waste material from the tank. The system will also contain an auger, positioned within the tank, that is adapted to convey the waste material from the tank.

In one embodiment, the handling member has a first end pivotly attached to the reciprocating carriage, and the second end has disposed therewith a process device. A reciprocating means is operatively associated with the handling member so that the elongated member may be pivoted within the tank. Generally, the process device is a vertically oriented auger attached to the handling member. Also, the system may include a slurry gate operatively associated with the pump means and adapted to receive the waste material discharged from the process device. In the preferred embodiment, the process device contains a vertically oriented spiral blade.

Also disclosed is an impeller means, operatively associated with the pump means, for loading the pump means. The impeller means may comprise a series of rotor blades rotatably mounted beneath the pump. The rotor blades may contain a vertically oriented plate member, with the plate member having a concave surface formed therewith that aids in channeling the waste into the pump. Additionally, the process device may contain a plurality of teeth adapted to the spiral blade of the process device. The process device may be detachably constructed with the handling member for selective detachment.

The second embodiment also discloses a process for handling waste materials. Generally, the process comprises placing the waste material within a system. The system will comprise a tank containing the waste material; a reciprocating carriage having a handling member adapted thereto; a pump means for pumping the waste material from the tank; a first auger, positioned within the tank, adapted to convey the waste material from the tank, and wherein the first end of the handling member is pivotly attached to the reciprocating carriage.

Next, the process includes transporting the carriage from a first position to a second position, and the drilling fluid waste is pumped from the tank. The operator will terminate the pumping and allow the waste to separate into a solid phase and a liquid phase. Thereafter, the operator will transport the carriage from a first location of the tank to a second location of the tank so that the solids phase is pushed to the second side of the tank, and thereafter, removing the solid phase from the tank with the first auger.

The system may further comprise pivoting means adapted to pivot the elongated member from a first position to a second position, and thus, the process further comprises pivoting the elongated member from the first position to the second position so that the drilling fluid waste is stirred.

It should be noted that the process may include channeling the waste to a process device, and thereafter, conveying the waste to the pump means via the process device. Next, the operator would transport the carriage from a first side of the tank to a second side of the tank so that the solid phase is pushed to the second side of the tank. The solid phase can then be removed from the tank with the first auger.

The pump means may include an impeller assembly operatively attached thereto, and with this embodiment, the process further comprises rotating the impeller which in turn channels the waste with the rotating impeller so that the pump is loaded.

In another embodiment of this invention, which is the most preferred embodiment of the application, a system for handling a waste material is disclosed. The system includes a tank that contains waste material and a reciprocating carriage that is operatively associated with the tank. The reciprocating carriage will have a handling member adapted thereto. A process device is attached to the reciprocating carriage, with the process device comprising a base having a first blade member extending radially therefrom. The blade member is adapted to channel the waste material downward.

The system further consist of a pump means operatively associated with the handling member, for receiving the waste material from the process device and pumping the waste material from the tank. The pump includes a first rotor blade and a second rotor blade positioned for loading the pump means. The first rotor blade and second rotor blade may include a first and second vertically oriented plate member, with the first and second plate member having a concave surface forming a scoop thereon that is adapted to deliver the waste material into a pump inlet.

The system may further comprise a motor operatively associated with the handling member so that the handling member may be pivoted within the tank. A slurry gate may also be included that is operatively associated with the pump means and adapted to receive the waste material channeled downward from the process device. A second blade member may be included that extends radially from the base. The second blade member is oriented in a plane opposite the first blade member and is configured to channel the waste material downward.

In the preferred embodiment, the first rotor blade and the second rotor blade are oriented in opposite planes about the pump inlet. A third flat plate and a fourth flat plate may also be included, with the flat plates being oriented in opposite planes. The system may further comprise a third blade member and a fourth blade member extending at an angular direction from the base so that the third blade member and the fourth blade member are adapted to channel the waste material downward. In this embodiment, the angular direction is at least 10 degrees.

According to the teachings of the present invention, the process device may be detachable from the handling member. Also, the first blade member, second blade member, third blade member and fourth blade member comprise a shaft having a first end and a second end, and wherein the first end is connected to the base, and the second end is connected to a paddle head. The paddle head may be offset relative to the shaft at an angle of deflection of at least 90 degrees.

In the most preferred embodiment of this application, a process for handling a drilling fluid waste from an oil and gas well bore is also disclosed. The process generally comprises placing a drilling fluid waste within an apparatus. The apparatus consist of a tank, a reciprocating carriage operatively associated with the tank, the reciprocating carriage having a handling member adapted thereto, with a pump means, operatively associated with the handling member, for pumping the drilling fluid waste from the tank. A process device, which is attached to the handling member, is orientated in a first plane. The process device includes a base having a first blade member and a second blade extending radially therefrom.

The process includes transporting the carriage from a first position to a second position and rotating the base of the process device so that the drilling fluid waste is directed downward with the first blade paddle head and with the second blade paddle head. The impeller will be rotated, with the impeller containing a first rotor blade and a second rotor blade positioned for loading the pump means via the inlet. The first rotor blade and second rotor blade comprise a first and second vertically oriented plate, with the first and second plate having a concave surface forming a scoop thereon and adapted to deliver the waste material into a pump inlet.

The process further consist of pumping the waste from the tank, and thereafter terminating the pumping. The operator will allow the drilling fluid waste to separate into a solid phase and into a liquid phase, and transport the carriage from the second position to a third position. The removal of the solid phase from the tank with the pump means may thereafter continue.

The process would then include pivoting the handling member from the first location to the second location and stirring the waste. The process would further entail transporting the carriage from a first side of the tank to a second side of the tank so that the solid phase is pushed to the second side of the tank. The solid phase may then be removed from the tank with the pump means. In one embodiment, a plurality of impeller members are rotated which in turn allows for accumulation of the waste within the scoops which in turn loads the waste into the inlet of the pump means.

A pump member is also disclosed. The pump member will include a motor having a shaft extending therefrom. A pump case having an inner cylindrical chamber is also included. The inner cylindrical chamber will receive the shaft. A circular base is positioned within the inner cylindrical chamber, with the shaft being attached to the center of the base.

The pump member also contains a first plate member and a second plate member extending vertically from the circular base. In one embodiment, the first plate member and the second plate member are disposed in radially opposing planes about the center. In the preferred embodiment, a first tail section extends from the first plate member and a second tail section extends from the second plate member. The first tail section and the second tail section can protrude outward from the opening. A disposal conduit is also included, and wherein the conduit extends from the pump case and is fluidly connected with the inner cylindrical chamber.

The pump may further comprise a third plate member and a fourth plate member extending vertically from the circular base. Generally, the third plate member and the fourth plate member are disposed in radially opposing planes about the circular base. Further, the first tail section and the second tail section contain concave surfaces forming a first scoop on the first tail section and a second scoop on the second tail section. A process device may be included with the pump, with the process device adapted to channel waste to the pump inlet.

An advantage of the present system is that the operator may remove tons of environmental waste from a site without spillage to the surrounding area. Another advantage is that the invention combines the concept of a backhoe, pump, dozer, and process device into a complete operable system.

Yet another advantage is that the present invention saves an operator time since in the past it was required to separately utilize the referenced components in order to adequately and safely handle the waste. Still yet another advantage is that the system herein disclosed will produce the operator significant savings.

An advantage of the second embodiment of the present invention includes use of a vertical auger that causes the slurry to be channeled downward. Another advantage is the vertical auger will shred, dissipate and disperse the solids into smaller particles that have better flow properties and/or may be suspended in the fluid phase. Yet another advantage is that the impeller will serve to agitate solids and/or suspend solids in the fluid phase.

Still yet another advantage is the impeller will effect a positive displacement to the pump by channeling and loading the waste into the pump inlet. In other words, the system will also have the advantage of force feeding the slurry into the pump via the impeller. Yet another advantage is the slurry gate cooperating with the vertical auger and pump impeller to accept the channeled slurry into the pump inlet.

An advantage of the third embodiment includes use of the cutter head that will shred, dissipate and disperse the solids into smaller particles that have better flow properties and/or may be suspended in the fluid phase. Yet another advantage of the cutter head is the ability to channel and direct the waste downward to the pump inlet.

A feature of the present invention includes use of a mobile trolley mounted on a rail system contained on the container with a motor means. Another feature includes a handling system operatively associated with the trolley. Another feature includes a handling system containing a shovel, backhoe, pump, and pivoting means mounted thereon.

Yet another feature includes an auger to remove accumulated solids within container. Still yet another feature includes a shovel that may function as wiper, stirrer, or spade. Another feature includes use of a pump that may be varied in position to accommodate the varying levels of waste, as well as the composition of the waste, within the container. Another feature includes operation of the handling system and trolley from a remote location.

A feature of the second embodiment includes use of a detachable process device such as a vertical auger. Another feature includes having a plurality of teeth placed on the vertical auger blades. Yet another feature includes use of a slurry gate that may be manually opened or closed. The rotatable blades of the impeller is yet another example of a feature of the present invention.

Another feature of the third embodiment includes having paddle heads that will cut, shear and sever the waste. Another feature of this embodiment includes having some blades vertical in relation to the ground level while another set of blades are inclined relative to the vertical blades. Still yet another feature includes the cutter head directs the waste downward. The cutter head will shred, dissipate and disperse the solids into smaller particles that have better flow properties and/or may be suspended in the fluid phase.

Still yet another feature of the third embodiment is the rotor blades having the concave scoop that is radially adjacent the pump inlet to load the pump. Another feature is the use of vertical plates coupled with the rotor blades in order to load the pump. Still another feature is that in this third embodiment, there are two rotor blades that are radially opposed to each other about the pump inlet. Yet another feature is that two vertical plates are included, with the two vertical plates being radially opposed to each other about the pump inlet.

BRIEF DESCRIPTION OF THE DRAWINGS

FIG. 10 is a front view illustration of the cutter head member of the present invention.

FIG. 11 is the side view of the cutter head member of FIG. 10.

FIG. 12 is a perspective view of the cutter head member of FIG. 10.

DESCRIPTION OF THE PREFERRED EMBODIMENTS

Figure 1:
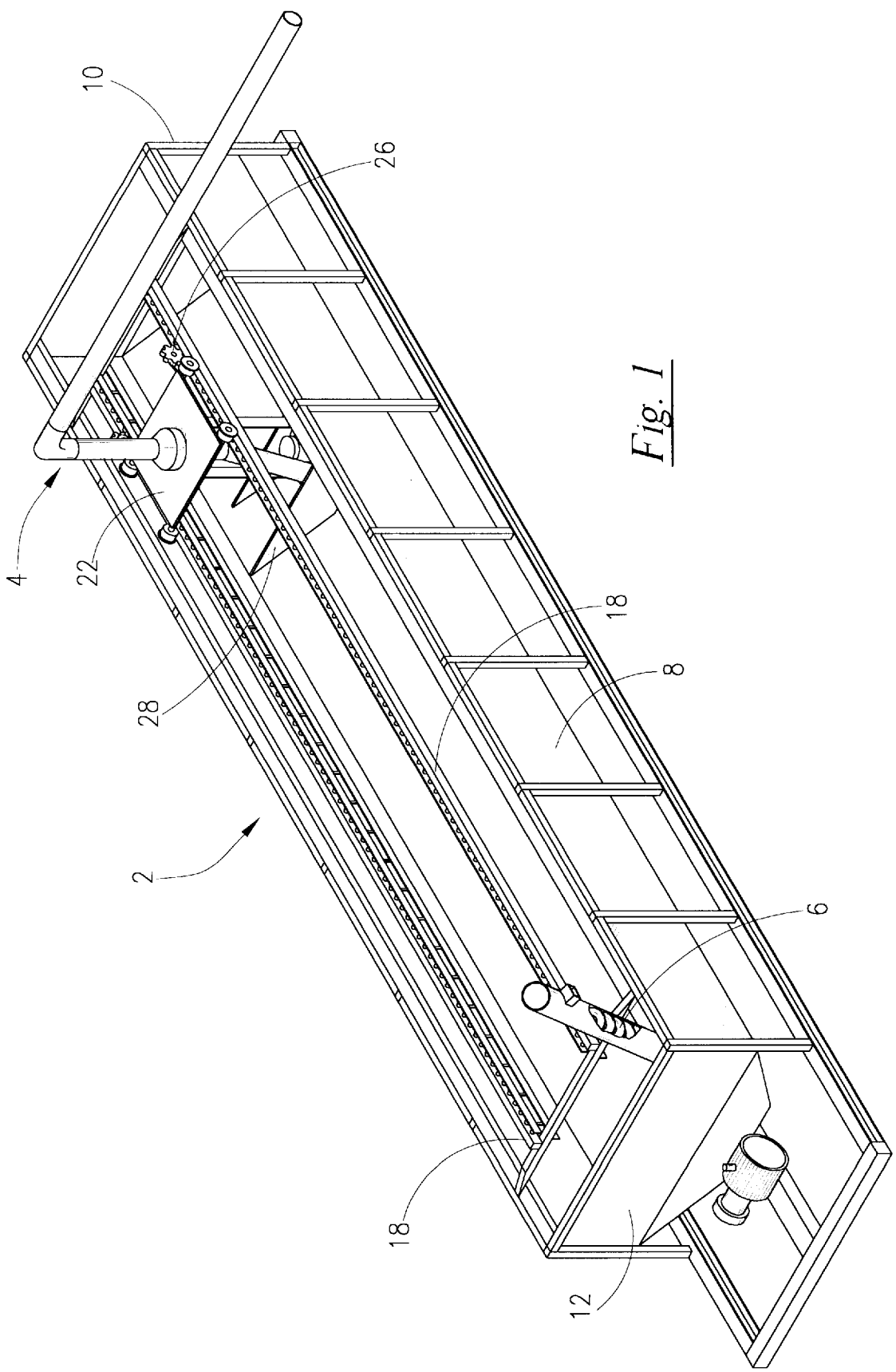
FIG. 1 is an illustration of the first embodiment of the apparatus including the container, trolley and handling system, with the handling system being in a first position.

Referring now to FIG. 1, an illustration of the apparatus 2, including the handling system 4 and auger 6, will now be described. Generally, the apparatus 2 includes a container 8 that in the preferred embodiment is an elongated tank member capable of holding the waste. The container 8 contains a first end 10 and a second end 12, with a bottom 14 and an open top end 16. As depicted in FIG. 1, the width of bottom 14 is generally narrower than the open top end 16 so that the movement of the waste within the container 8 may be facilitated, as will be more fully set out later in the application.

The container 8 is designed so that it can be easily transported from located to location. Thus, the container 8, along with the handling system 4 and auger 6 may be used on land locations, or alternatively, may be transported and placed on offshore platform or other remote locations.

The container 8 has contained thereon a pair of rails 18 that are mounted onto the container 8 by means of support braces 20. As shown in FIG. 1, the rails 18 transverse the open top end 16. It should be noted that while a pair of rails 18 has been depicted, a single rail member is within the scope of this invention.

The pair of rails 18 will have operatively associated therewith the handling system 4. The handling system 4 is mounted on a platform 22 with the platform having a set of wheels 24. The platform 22 may also be referred to as the trolley 22. The platform 22 will also contain a pair of sprocket wheels 26 which are propelled by a motor means, which will be described later in the application, so that the handling system is moved back and forth from the first end 10 to the second end 12 as desired by the operator. The sprocket wheel 26 projections fit within and engaged with the tracks 80 for traction.

The handling system 4 will have extending into the container 8 a shovel means 28, operatively associated with the platform 22, for transporting the waste from one end 10 to the other end 12 of the container. Alternatively, the shovel means 18 may be used to stir the waste contained within the container 8. The handling system 4 will also have associated therewith a pump means 30, operatively associated with the shovel means 28, for pumping the waste from the container 8. It should be noted that throughout the application, like numbers in the various figures refer to like components.

Figure 2:
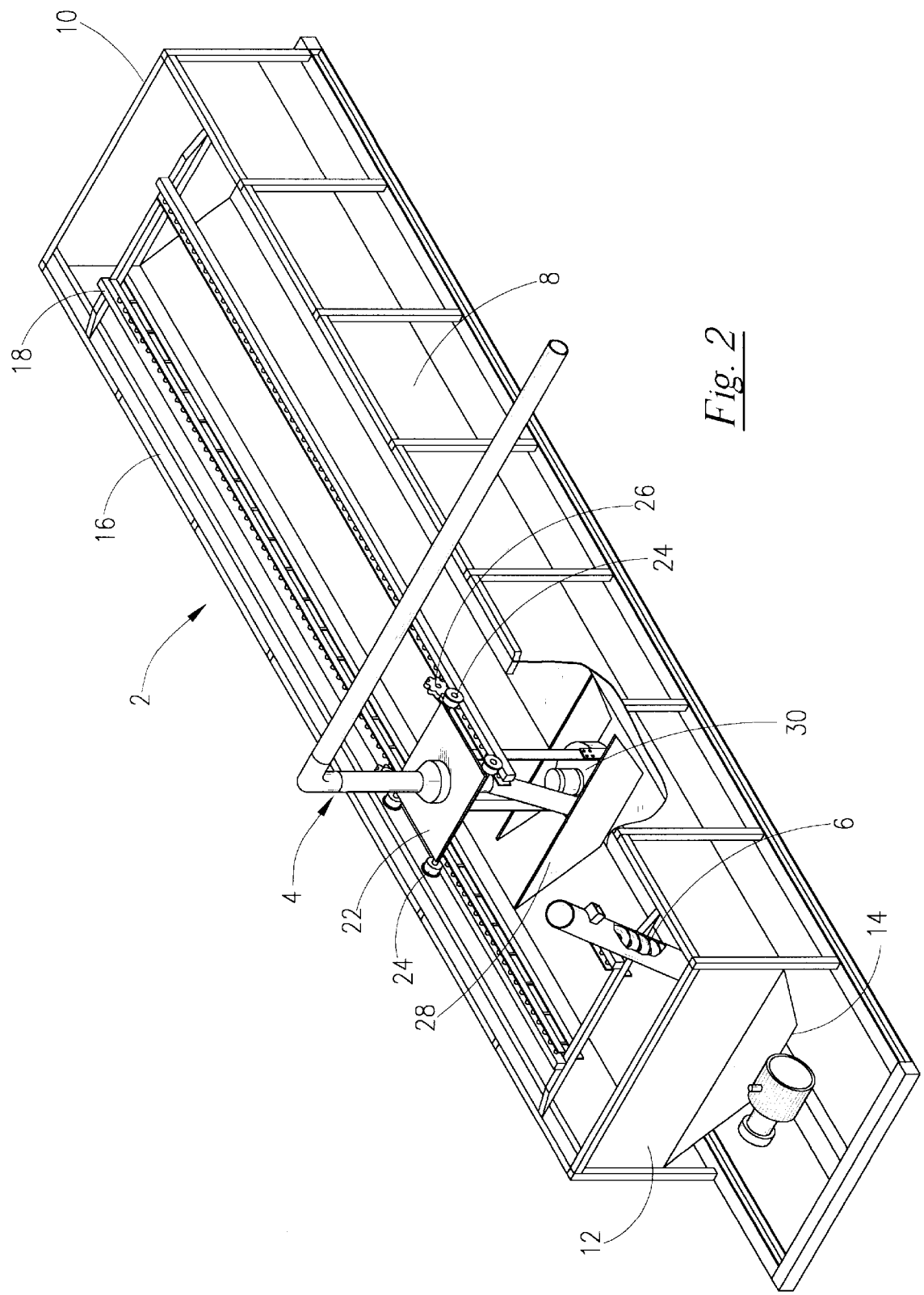
FIG. 2 depicts the apparatus of FIG. 1 with the handling system in a second position.

Referring now to FIG. 2, the apparatus 2 of FIG. 1 is illustrated wherein the trolley 22 and handling system 4 has been moved to a second position. The transporting of the handling system 4 is controlled by activating the motor so that the sprocket wheels 26 revolve so that the trolley 22 (via the wheels 24) is moved. The shovel means 28 will also travel within the container 8. The shovel means 28 is held in a rigid position, perpendicular to the bottom 14. Thus, the waste within the container is pushed to the end 12. At this point, the auger 6 may be activated in order to transport the waste from the container 8.

Figure 3:
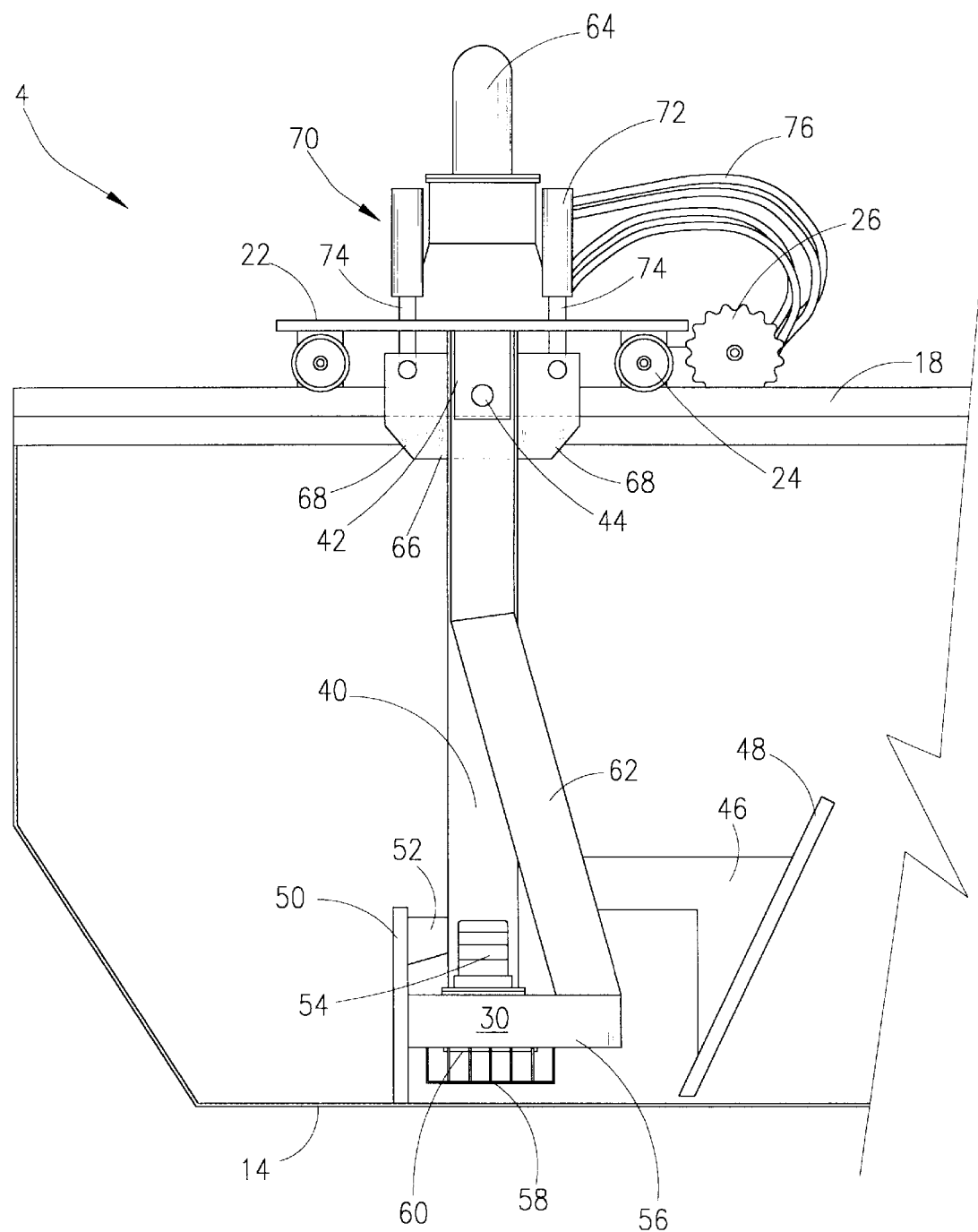
FIG. 3 is a schematic side view illustration of an embodiment of the handling system of the first embodiment.

As seen in FIG. 3, an expanded view of the handling system 4 will now be described. As illustrated, the trolley 22 has attached thereto the wheels 24 which are positioned on the track 18. Also associated with the trolley 22 is the sprocket wheels 28 which are driven by a motor means 38 for propelling the sprocket wheels 28.

The shovel means 28 will have associated therewith a boom ladder member 40, with the boom ladder member 40 extending from an extension member 42. The boom member 40 and the extension member 42 are pivotally attached by conventional means such as by pin 44. The extension member 42 is attached to the platform 22.

The boom ladder member 40 will have attached thereto an extension member 46, with the extension member in turn having a shovel blade 48. As depicted in FIG. 3, the shovel blade 48 is tilted at an angle relative to the bottom 14 of container 8. Also depicted in FIG. 3 is a detachable shovel blade 50 which in turn is attached to the boom member 40 via the extension member 52, with the detachable shovel blade 50 facing in an opposite plane with respect to the shovel blade 48. Thus, in operation as the handling system 4 is moved from a first position to a second position and then back to the first position, the shovel blade 50 can act to shovel the waste in a second direction. In an alternative embodiment, the detachable shovel blade 48 need not be connected.

The handling system 4 has included therewith a pump means 30 which includes the pump motor 54 which in turn is adapted to the pump case cylinder 56. A guard 58 is also included so that the suction inlet 60 is raised enough off the bottom so that large solids do not enter the pump or block off the suction inlet 60. A disposal conduit 62 leads from the pump cylinder 56 so that the siphoned waste will lead to the swivel joint conduit 64 for ultimate disposal.

Also included will be a plate 66 aiding in the attachment of the boom ladder member to the handling system 4, and associated therewith will be bottom rollers 68 which aids in keeping the platform 22 on the track 18. The handling system 4 will also include the oscillating means 70 for oscillating and pivoting the boom ladder 40. Generally, the oscillating means 70 contains a pair of hydraulic cylinders 72 that have a cooperating pair of hydraulic cylinder rams 74. The oscillating means 70 will be operatively connected to a hydraulic line system 76, with the line system 76 being long enough so that as the handling system travels along the rail 18, the line system 76 will extend the proper distance. Also, back and forth movement of the trolley 22 along the rail 18 is possible.

Figure 4:
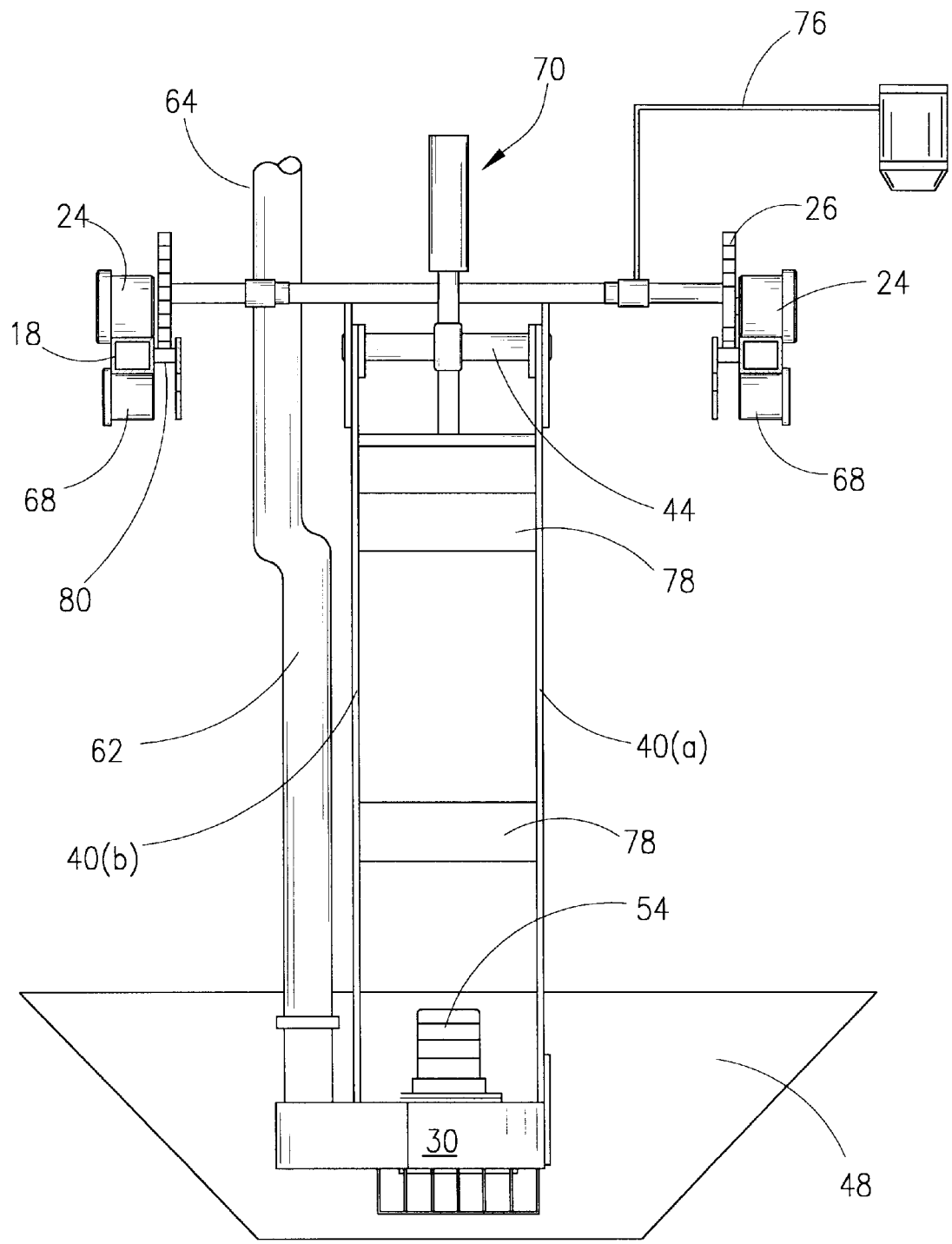
FIG. 4 is a schematic front view illustration of the handling system of FIG. 3.

Referring now to FIG. 4, a front elevation of the handling system 4 is shown. In the preferred embodiment, the boom member 40 has a first leg 40a and a second leg 40b, with the support braces 78 also being included. Also depicted in FIG. 4 is the cooperation of the wheels 24 and the bottom rollers 68 with the rail 18. Additionally, the oscillating means 70 is depicted with the swing cylinders 72 that lead to the hydraulic cylinder rams 74.

FIG. 4 also depicts the means by which the handling system 4 travels along the rail and track 80. More particularly, the sprocket wheels 26 are adapted for engagement with the track 80, with the track 80 being capable of receiving the sprocket projections.

Figure 5:
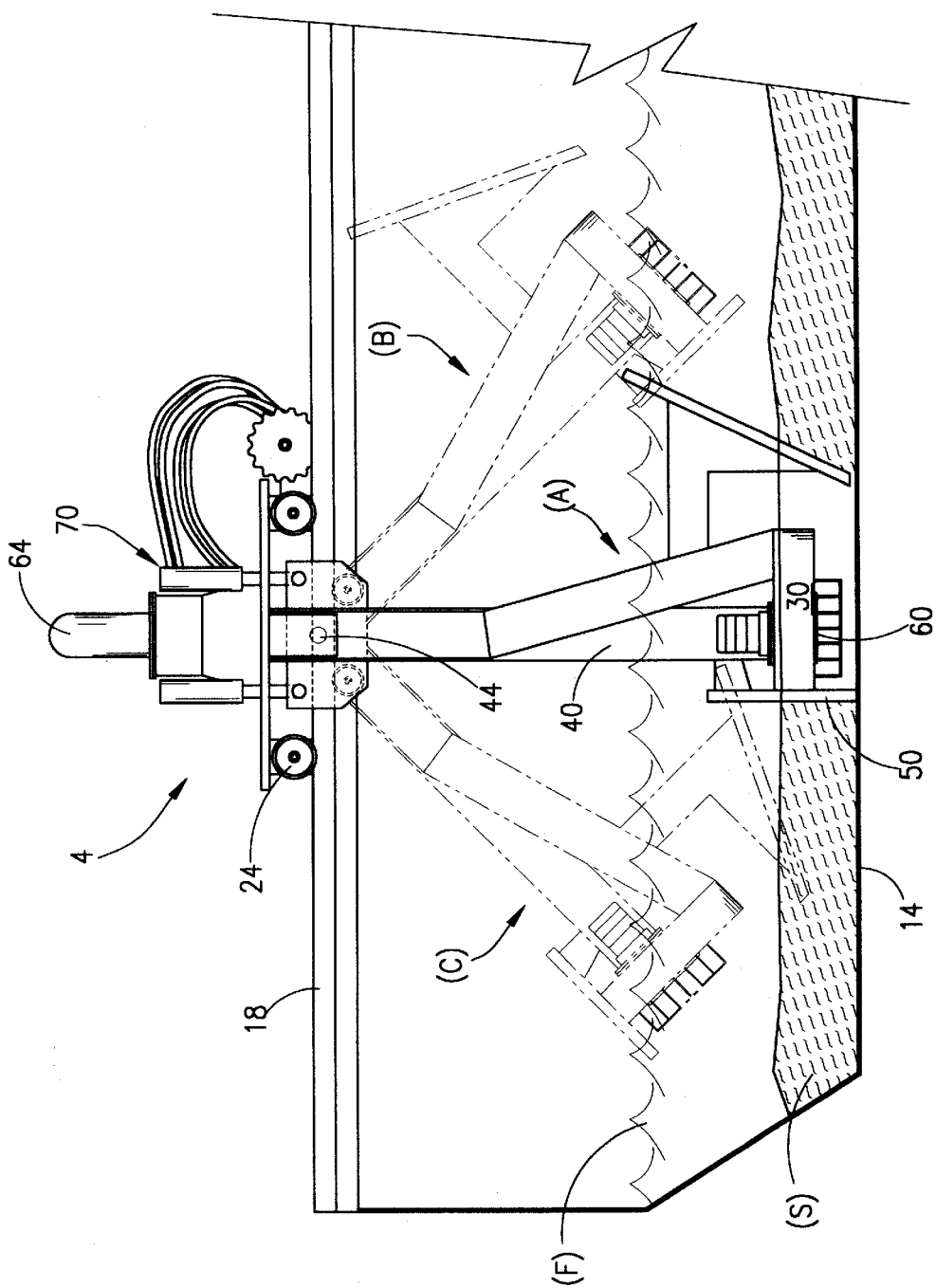
FIG. 5 depicts the schematic side view illustration of the handling system of FIG. 3 in various positions within the container.

Referring now to FIG. 5, the operation of the invention will now be discussed. As shown, the handling system 4 has the boom ladder 40 extended perpendicular relative to the bottom 14 in the position designated by the letter (A). In the illustration of FIG. 5, the container 8 has a waste disposed therein. More particularly, the waste has two different phases, namely: (1) a mostly liquid phase with solids disposed therein; and, (2) a mostly solid phase with a liquid disposed therein.

Thus, with the boom 40 in the position as representative by (A), the operator may activate the motor means so that the sprocket wheels 26 rotate which in turn moves the trolley 22 and handling system 4 forward on the rails 18. As the handling system moves forward, the shovel blade 48 will heap the waste in the direction of the auger 6 for removal by the auger 6. Alternatively, the operator may reverse the direction of the handling system 4 so that the detachable shovel blade 50 will heap the waste in the opposite direction of travel. The operator may also kick on the pump means 30 to suction off accumulated liquid during this process. This can continue at the discretion of the operator until the container 8 is properly emptied.

As an alternate means of operation, the operator may pivot the boom ladder member 40 as shown in the position (B) of FIG. 5. This is accomplished by activating the hydraulic cylinders so that the hydraulic rams pivot the boom ladder member 40. If desired, the position (B) corresponds with a level that places the suction point 60 within the fluid (F) phase.

At the position shown in (B), the pump means 30 may be activated which in turn will suction the fluid (F) phase into the disposal conduit 62. Of course, if so desired by the operator, the sprocket wheel 26 may be activated which in turn would cause the handling system 4 to travel via the rails 18. Thus, the waste would also be stirred by such action. An oscillating movement of the boom 40 may aid in stirring the waste, or alternatively, dislodge unwanted piles of solids that have built up within the container 8.

As yet another alternate means of operation, the operator may pivot the boom ladder member 40 as shown in the position (C) of FIG. 5. This is accomplished by activating the hydraulic cylinders so that the hydraulic rams pivot the boom ladder member 40 backward relative to position (B). Again, the position (C) may correspond with a level that places the suction point within the fluid (F) phase.

Therefore, the operator may activate the pump means 30—at the position shown at (C)—which in turn will suction the fluid (F) phase into the disposal conduit 62. The handling system 4 may again be moved via the sprocket wheel 26. An oscillating movement of the boom 40 may aid in stirring the waste, or alternatively, dislodge unwanted piles of solids that have built up within the container 8. The movement of the boom 40, handling system 4 and activation of the pump means 30 is done by the operator depending on the particular characteristics of the waste.

The boom 40, handling system 4, auger 6 and activation of the pump means 30 may be controlled remotely from a site away from the container, or alternatively, the control system for the operator may be placed on the container.

Figure 6:
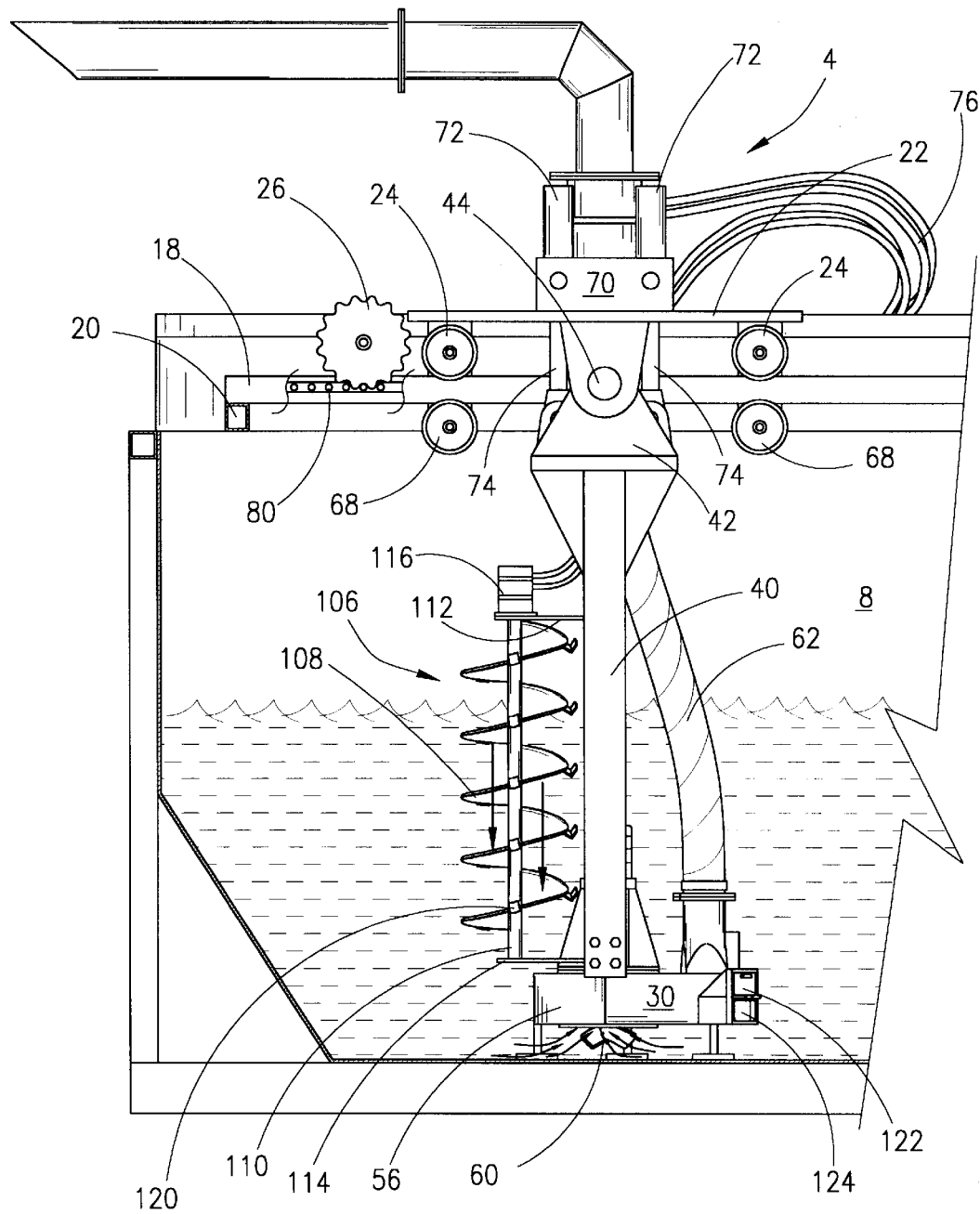
FIG. 6 is an illustration of the second embodiment of the apparatus including the container, trolley and handling system, with the handling system being in a first position.

Referring now to FIG. 6, an illustration of the second embodiment (which is the preferred embodiment of this application) of the apparatus 2 including the container 8, trolley 22 and handling system 4, with the handling system 4 being in a first position, will now be described. It should be noted that like numbers appearing in the various figures refer to like components. Generally, the apparatus 2 is similar in construction to the first embodiment.

Thus, platform 22 is operatively associated with the rails 18 situated with the container 8. As previously described, extending therefrom is the disposal conduit 62 that is operatively associated with the pump means including the pump motor 54 and pump cylinder 56. With the preferred apparatus 2, a process device 106, which in the preferred embodiment is an auger, has been selectively attached to the boom ladder member 40. Thus, the second auger 106 will comprise a generally spiral blade 108 coiled about a centered mandrel 110. The second auger 106 is rotatably attached via the supports 112 and 114, with the supports being detachably affixed to the boom ladder member 40. A hydraulic member 116 is operatively associated with the detachable second auger 106 so as to power the detachable auger 106 to rotate.

The detachable second auger 106 will process the slurry by blending, mixing, and dispersing the solids into the fluid phase so that the slurry is more manageable since the slurry is more consistent. Also, the flow properties of the slurry are significantly increased. The second auger 106 will also act as a shovel and/or wiper since it tends to collect the waste so that the waste may be handled. The auger spiral blades 108 will also contain upstanding projections or teeth 120 that will aid in the ripping apart of the solids. As shown in FIG. 6, the auger 106 will funnel the slurry downward towards the pump cylinder 56.

Also included with the present invention is the slurry gate 122 which is a valve means that has an open position and a closed position. In the embodiment shown in FIG. 6, the slurry gate 112 is a manually opened or closed gate. When the gate 122 is opened, the inlet 124 will receive the slurry and transport the slurry into the pump cylinder. Alternatively, the operator may wish to have the slurry gate closed wherein the slurry would be received in pump inlet 126. The slurry gate 122 is configured to receive the slurry being discharged from the auger 106 as well as receiving the slurry from the bottom area of the container 8 as shown by the flow lines in FIG. 6. The operator may deem it appropriate to close the slurry gate, when for instance, the detachable auger 106 has been detached and/or the detachable auger 106 is not in use. The slurry gate 122 will have extendable arms 124 for closing and opening the gate 122.

Figure 7:
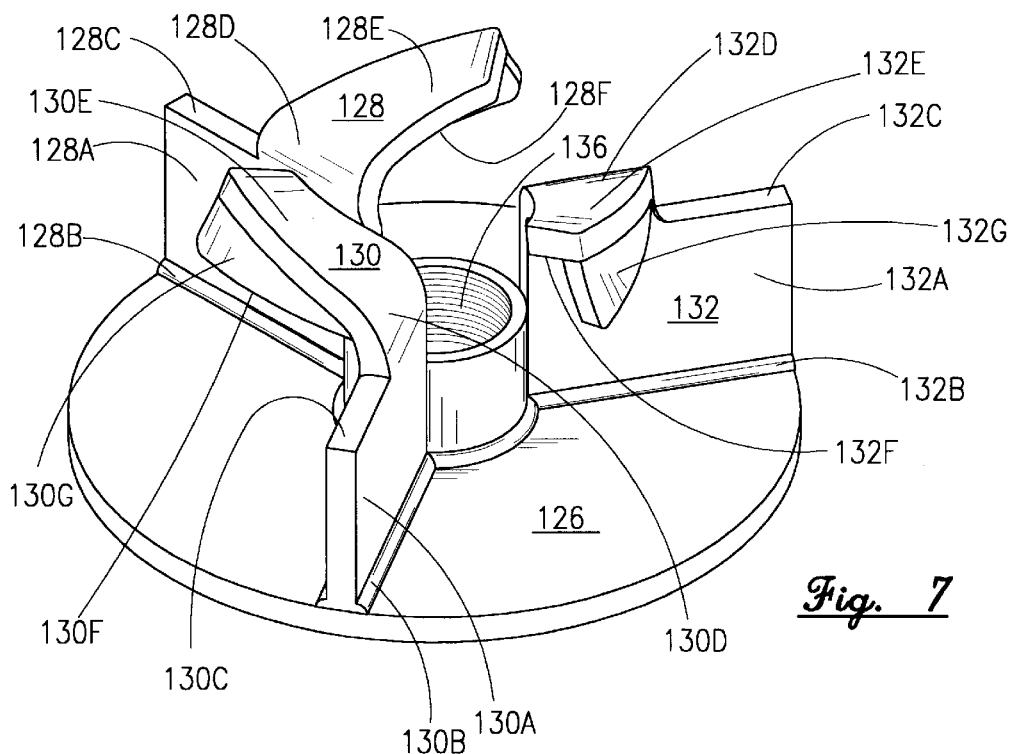
FIG. 7 is a perspective view of the first embodiment of the impeller device.

Also shown in FIG. 6 is the impeller member 126 that are configured at the bottom of the pump cylinder 56. The impeller member 126 is seen in FIG. 7 and comprises a plurality of blades 128, 130, 132 that are rotatably mounted on the pump means. The impeller blades 128, 130, and 132 are vertically oriented blades that extend from a horizontal base plate 134, with the horizontal base plate 134 being operatively configured with the pump inlet, with the pump inlet being configured on the bottom of the pump cylinder 56. The horizontal base plate 134 contains the opening 136 which is operatively configured to be connected to the pump inlet.

Each of the blades 128, 130, 132 will be of similar construction. Thus, for instance, blade 128 will have a substantially flat plate 128A, with the plate 128A having a first end 128B that is attached to the horizonal base plate 134 by conventional means, such as welding. The plate 128A will extend to the second end 128C, with the end 128C containing the curved tail area 128D. The tail area 128D extends from the side radially adjacent the opening 136. As seen in FIG. 7, the tail area has a surface 128E and a surface 128F with the surfaces 128E being convex and surface 128F being concave (in the preferred embodiment) such that a pocket or scoop is formed thereon. The blade 130 will have a substantially flat plate 130A, with the plate 130A having a first end 130B that is attached to the horizonal base plate 134. The plate 130A will extend to the second end 130C, with the end 130C containing the curved tail area 130D. The tail area 130D extends from the side radially adjacent the opening 136. The tail area has a surface 130E and a surface 130F with the surfaces 130E being convex and surface 130F being concave (in the preferred embodiment) such that a pocket or scoop is formed thereon. Also blade 132 will have a substantially flat plate 132A, with the plate 132A having a first end 132B that is attached to the horizonal base plate 134. The plate 132A will extend to the second end 132C, with the end 132C containing the curved tail area 132D. The tail area 132D extends from the side radially adjacent the opening 136. The tail area has a surface 132E and a surface 132F with the surface 132E being convex and surface 132F being concave (in the preferred embodiment) such that a pocket or scoop is formed thereon.

Figure 8:
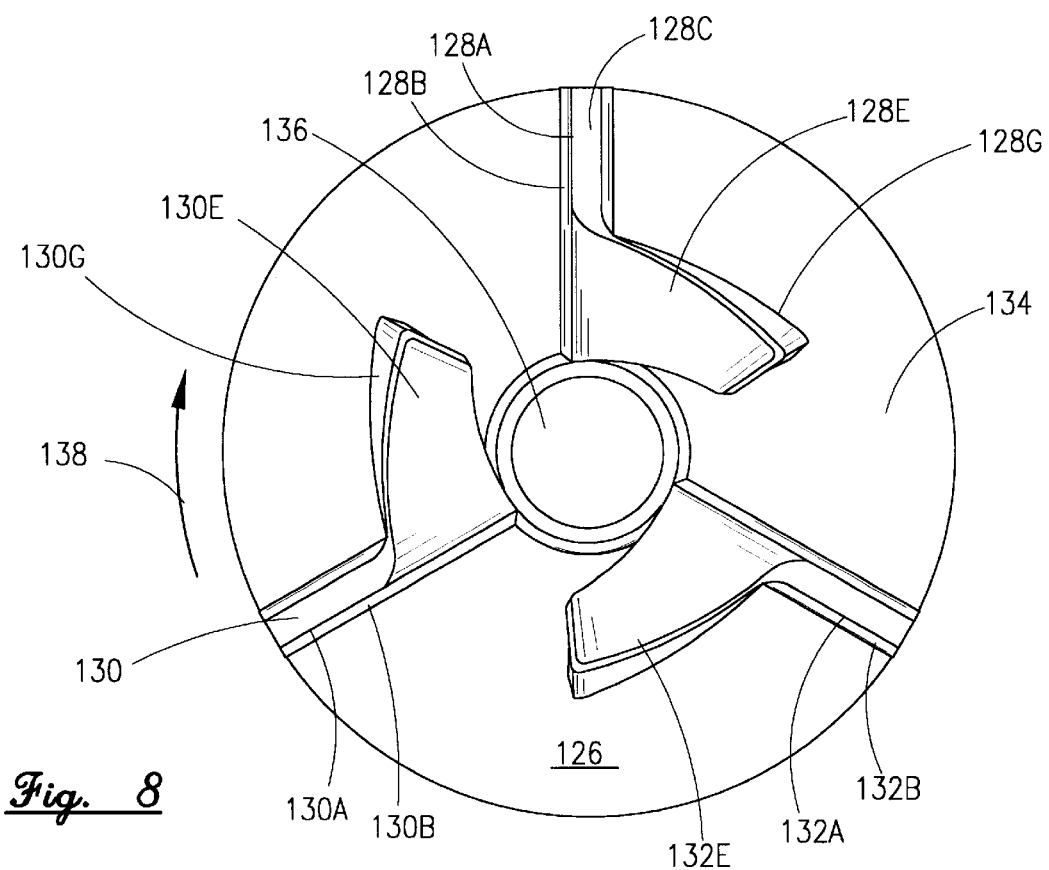
FIG. 8 is a top view of the impeller device of FIG. 7.

The FIGS. 7 and 8 also illustrate a side 128G, 130G, and 132G that has been added. The sides 128G, 130G, 132G generally extend perpendicularly away from the surface 128F, 130F, and 132F respectively. The sides 128G, 130G and 132G form a cup section on the blades in the preferred embodiment. As can be seen by the arrow 138 which depicts the rotation of the impeller, the rotation is such that the concave surface 128F in combination with the plate surface 128A will act to funnel the waste into the opening 136. The action of concave surfaces 128F, 130F, and 132F will create a positive displacement of the waste into the pump. The centrifugal action of the blades 128, 130 and 132 forces the waste into the opening 136 which significantly aids in the efficiency of the pump means and the evacuation of the waste from the container. In other words, the rotation of the blades 128, 130 and 132 aids in the creation of energy necessary to funnel the waste into the pump inlet. Also, when the blades 126 are energized, the rotation will agitate and blend the slurry to a preferred consistency that will better enable the slurry to be pumped into the pump cylinder 56. FIG. 8 has also been included to depict the top view of the impeller member 126.

Figure 9:
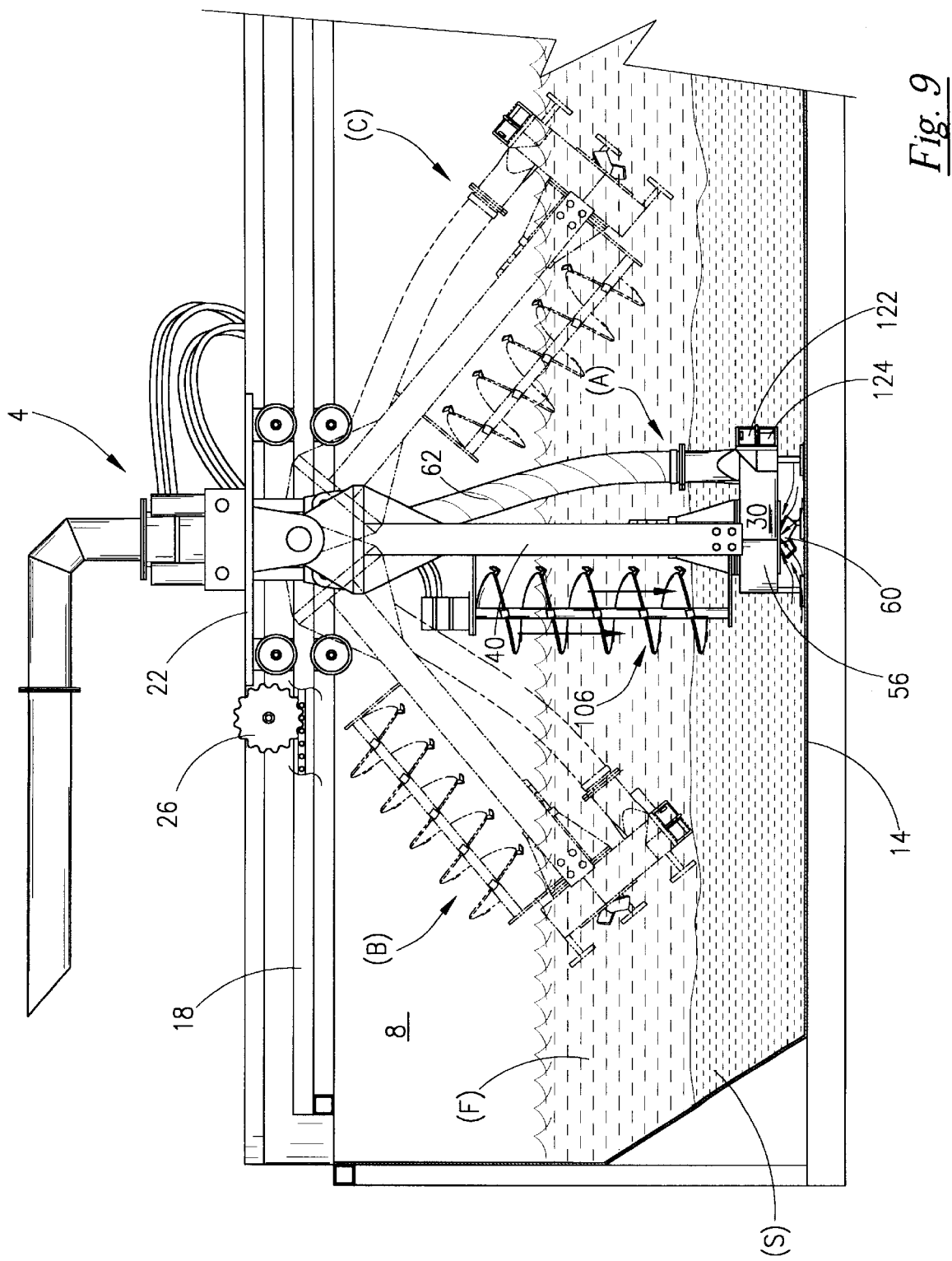
FIG. 9 depicts the schematic side view illustration of the handling system of FIG. 6 in various positions within the container.

Referring now to FIG. 9, the operation of the invention depicted in FIG. 6 will now be discussed. As shown, the handling system 4 has the boom ladder 40 extended perpendicular relative to the bottom 14 in the position designated by the letter (A). In the illustration of FIG. 7, the container 8 has a waste disposed therein. More particularly, the waste has two different phases, namely: (1) a mostly liquid phase with solids disposed therein; and, (2) a mostly solid phase with a liquid disposed therein.

Thus, with the boom 40 in the position as representative by (A), the operator may activate the motor means so that the sprocket wheels 26 rotate which in turn moves the trolley 22 and handling system 4 forward on the rails 18. As the handling system moves forward, the auger 106 will also be rotating. Therefore, the auger 106 will funnel the waste in the direction of the slurry gate 122 for channeling into the pump cylinder 56 to suction off the slurry via pump means 30. The operator may reverse the direction of the handling system 4 so that the handling system 4 travels in an opposite direction thereby traversing the container bottom 14. This can continue at the discretion of the operator until the container 8 is properly emptied.

As an alternate means of operation, the operator may pivot the boom ladder member 40 as shown in the position (B) of FIG. 7. This is accomplished by activating the hydraulic cylinders so that the hydraulic rams pivot the boom ladder member 40. If desired, the position (B) corresponds with a level that places the suction point 60 within the fluid (F) phase.

At the position shown in (B), the pump means 30 may be activated which in turn will suction the fluid (F) phase into the disposal conduit 62. The auger 106 may be activated so that slurry may be funneled through the blades 108. Even though the inlet 124 may be in the fluid phase, since the slurry will still contain some solids, the action through the auger 106 will only aid to in the blending of the slurry for a better slurry consistency for pumping and discharge. As with the operation of the first embodiment (as seen in FIG. 5), the sprocket wheel 26 may be activated which in turn would cause the handling system 4 to travel via the rails 18. Thus, the waste would also be stirred by such action. An oscillating movement of the boom 40 may aid in stirring the waste, or alternatively, dislodge unwanted piles of solids that have built up within the container 8.

As yet another alternate means of operation, the operator may pivot the boom ladder member 40 as shown in the position C of FIG. 9. This is accomplished by activating the hydraulic cylinders so that the hydraulic rams pivot the boom ladder member 40 backward relative to position (B). Again, the position C may correspond with a level that places the suction point within the fluid (F) phase.

Therefore, the operator may activate the pump means 30—at the position shown at C— which in turn will suction the fluid (F) phase into the disposal conduit 62. The handling system 4 may again be moved via the sprocket wheel 26. An oscillating movement of the boom 40 may aid in stirring the waste, or alternatively, dislodge unwanted piles of solids that have built up within the container 8. The movement of the boom 40, handling system 4 and activation of the pump means 30 is done by the operator depending on the particular characteristics of the waste.

The boom 40, handling system 4, auger 6 and activation of the pump means 30 may be controlled remotely from a site away from the container, or alternatively, the control system for the operator may be placed on the container.

Referring now to FIG. 10, a second embodiment of a process device 150 will now be described, with the process device 150 being referred to as a cutter head 150. The cutter head 150 comprises a generally cylindrical base member 152, with the base member 152 being operatively attached to the pump housing 56 in one embodiment. The base member 152 will rotate about the connection point 154.

The base 152 will have a plurality of blades radially extending therefrom, namely blades 156, 158, 160, 162, 164, 166. These blades (156–166) generally contain a shaft 168 having a first end 170 and a second end 172, with the first end 170 being attached to the base 152. The second end 172 will have operatively attached thereto a paddle head 174. As depicted in FIG. 10, second end 172 will be attached to the paddle head 174 via screw and bolt means. Other fastener means are available.

The paddle head 174 is formed so as to constitute a shovel like blade that acts to channel waste material downward upon rotation of the base 152. The shaft 158 includes the paddle head 176, shaft 160 includes paddle head 178, shaft 162 includes paddle head 180 shaft 164 includes paddle head 182, and shaft 166 includes paddle 184. The paddle heads 174–184 will be of like construction in the preferred embodiment. The paddle heads will extend from the shaft at an angle so that the channeling of the waste downward is facilitated, with the angle of deflection being approximately 120 degrees relative to the shaft as shown by the letter "A" in FIG. 10.

The cutter head 150, and in particular the base 152, will be rotated in a generally to clockwise fashion. However, it is possible for the base to be rotated in the counterclockwise fashion. The shafts 156,158,160,162,164,166 may be an "L" shaped member (as better depicted in FIGS. 11 and 12) for structure and stability.

Referring now to FIG. 11, a side view of the cutter head 150 will now be described. FIG. 11 depicts that orientation of the shafts relative to the base 152. Thus, the shafts 166, 160 are essentially vertical while the shafts 156, 158, 162, and 164 are inclined relative to base 152. The shafts 158, 162 are inclined at an angle "B" of approximately 60 degrees relative to the shaft 160, and the shafts 156, 164 are inclined at an angle "B of approximately 60 degrees relative to the shaft 166. The angles "A" and "B" provide for proper mixing and channeling of the waste material downward to the pump means. The paddle heads 174, 176, 178, and 184 are also depicted in FIG. 11. The paddle heads include a triangular shaped profile in the preferred embodiment. FIG. 12 has also been included, with FIG. 12 being a perspective view of the cutter head 150. Note the inclination of the paddle heads 174,176,178,180,182, and 184 relative to the shafts.

A second embodiment of the impeller assembly 200 will now be described with reference to FIG. 13. In this embodiment of the impeller assembly, which is the preferred embodiment of this application, there is included the base plate 202 that has the first rotor blade 204 and second rotor blade 206. The blade 204 is radially opposite to blade 206 relative to the center inlet area 208. The center inlet area 208 is formed which allows for input into the pump means as will be fully explained. The rotor blade 204/206 comprise generally a first vertical section that extends to a second section curved tail, with the second section including a plate member having a concave surface and a complementary convex surface so that a scoop is formed thereon. The tail area is generally an elongated rectangular member that is curved toward the center inlet area 108 as will be more fully described below. In the preferred embodiment, the tail areas have an approximately 90 degree shoulder represented by the letter "C". A blade side is also added to each individual curved tail, as will be fully explained.

Thus, the rotor blade 204 stretches to the concave surface 210 with the complimentary convex surface 212 associated therewith, and wherein the concave surface 210 forms the scoop that, upon rotation of the base plate 202, will load the slurry into the center inlet area 208. The centrifugal action will then force the slurry outwards to the walls of the cylindrical pump case. A blade side 213 may be added to the tail. The blade side 213 extends from the concave surface 210.

The rotor blade 206 stretches to the concave surface 214 with the complimentary convex surface 215 associated therewith, with the concave surface 214 forming the scoop that, upon rotation of the base plate 202, will load the slurry being pump into the center inlet area 208. In the preferred embodiment, a blade side 216 is added to the tail. The blade side 216 extends downward from the concave surface 214.

Figure 13:
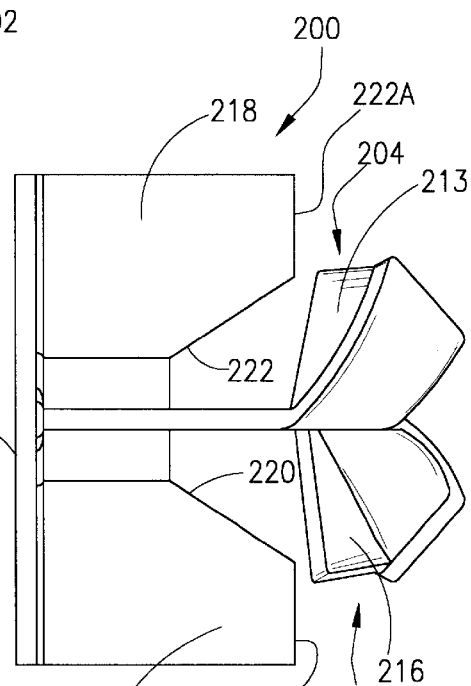
FIG. 13 is a side view of the second embodiment of impeller device.

The impeller assembly 200, as shown in FIG. 13, contains a vertical plate 217 with chamfered surface 220, and the vertical plate 218 contains the chamfered surface 222, also adjacent the center inlet area 208. The chamfered surface 220 leads to the upper surface 220A while the chamfered surface 222 leads to the upper surface 222A. Note that there is a gap between the upper surface 220A and 222A and blade sides 213 and 216. The chamfered surfaces 220, 222 allows passage of the slurry from said center inlet area 208 outwards to the walls of the pump case. This is due to the centrifugal action created during rotation of the impeller assembly 200.

An upper view of the impeller assembly 200 embodiment depicted in FIG. 13 will now be described with reference to FIG. 14. The FIG. 14 also depicts the rotation direction "E" of the impeller assembly. Note that the two rotor blades 206,204 are radially opposed to each other about the center inlet area 208. Further, the two vertical plates 217,218 are also radially opposed to each other relative to the center inlet area 208. In this fashion, the tail surfaces 210,214 aid in loading the pump with a positive displacement. The chamfered surfaces 220,222 also create a funnel passage for the waste to enter the pump case and be positively displaced via the centrifugal action to the walls of the pump case. A perspective view of the impeller 200 has been included in FIG. 15. Thus, the two rotor blades 206,204 are radially opposed to each other about the pump inlet area 208 as well as the vertical plates 217,218.

Figure 15:
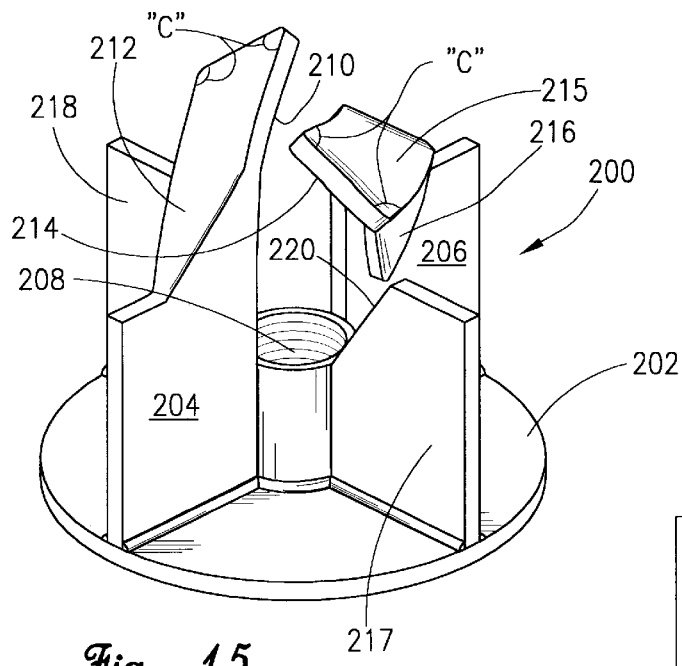
FIG. 15 is a perspective view of the impeller device of FIG. 13.
Figure 14:
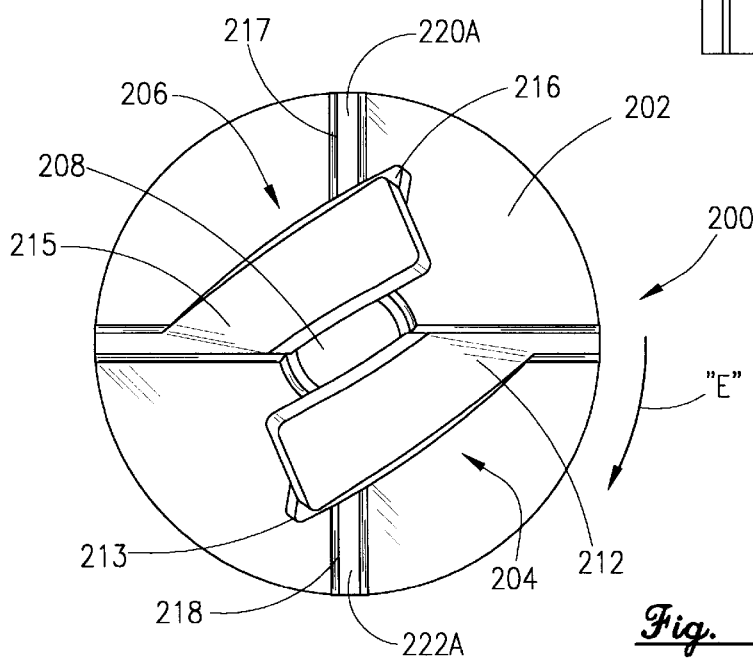
FIG. 14 is an upper view of the impeller device of FIG. 12.

The operation of the impeller assembly of FIGS. 13, 14 and 15 is essentially the same as the embodiment of FIGS. 7 and 8 and is incorporated herein by reference. The action of concave surfaces 210,214 will create a positive displacement of the slurry into the pump via center inlet area 208. The centrifugal action of the blades 204, 206, 216, 218 forces the waste into the opening area 208 and then outward to the walls of the pump case which significantly aids in the efficiency of the pump means and the evacuation of the waste from the container.

Moreover, the ends of the curved tail blades 210,214 extend outward from the pump case. The novel design of the concave/convex curved tail surfaces of the blades acts to initially grab, seize and retain the slurry. The centrifugal action works to transport the slurry from the concave area to the blade surfaces 204,206 and ultimately outward to the pump case wall. The chamfered surfaces 220,222 also allows for passage of the slurry from the center inlet area 208 to the plates 217,218 and ultimately outward to the pump case walls.

This design significantly aids in the pumping of the slurry over prior art pumps. Remember, the slurry will generally contain a mixture of solids and fluids. The design herein disclosed is particularly useful for the pumping of slurries with significant concentration of solids. The square edge blade is superior over prior art impeller designs because applicant's novel impeller moves a greater percentage of solids. In experimental testing, the novel pump has pumped approximately 86% solids concentration of a slurry. This design, therefore, gives the ability to pump a greater concentration of solids as compared to liquids in a slurry.

Figure 16:
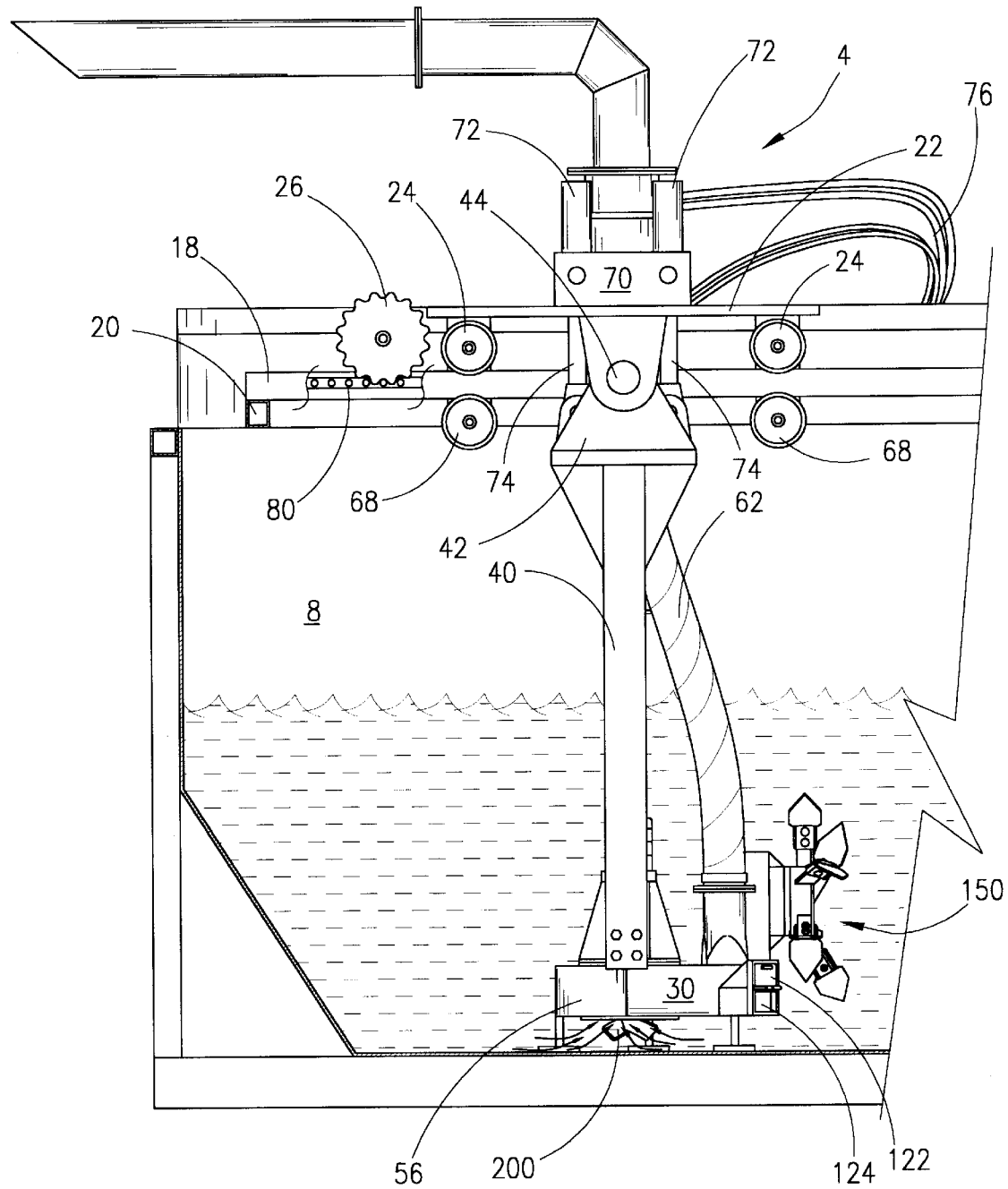
FIG. 16 is an illustration of the third embodiment of the apparatus including the container, trolley and handling system, with the handling system being in a first position.

Referring now to FIG. 16, the third embodiment of the apparatus is illustrated. The third embodiment includes the cutter head 150 and the impeller assembly 200 as well as the container, trolley and handling system, with the handling system being in a first position. The process for handling waste is similar to the other embodiments already described. The process utilizing the embodiment of FIG. 14 may include transporting the carriage from a first position to a second position and rotating the cutter head 150 via rotation of the base 152 which in turn rotates the paddle heads 174, 176, 178, 180, 182, 184. Due to the shape and design of the paddle heads 174184, the waste material is directed generally downward. The cutter head 150 also acts to shred the solids as previously described.

During this process, the pump means 30 will be pumping the waste material via the impeller assembly 200. As part of the process, the impeller assembly 200 will be rotating. Thus, the novel design of the tail sections 210, 214 loads the pump means 30 via inlet 208 as previously described. The waste is, therefore, removed from the tank. The operator may then terminate the pumping and allow the drilling fluid waste to separate into a solid phase and into a liquid phase. The carriage is traversed via the rails. The cutter head 150 may continue to rotate during this phase. Once the carriage is moved, the pumping may resume. Also, it is possible to pivot the handling member during the process as previously described.

Figure 17:
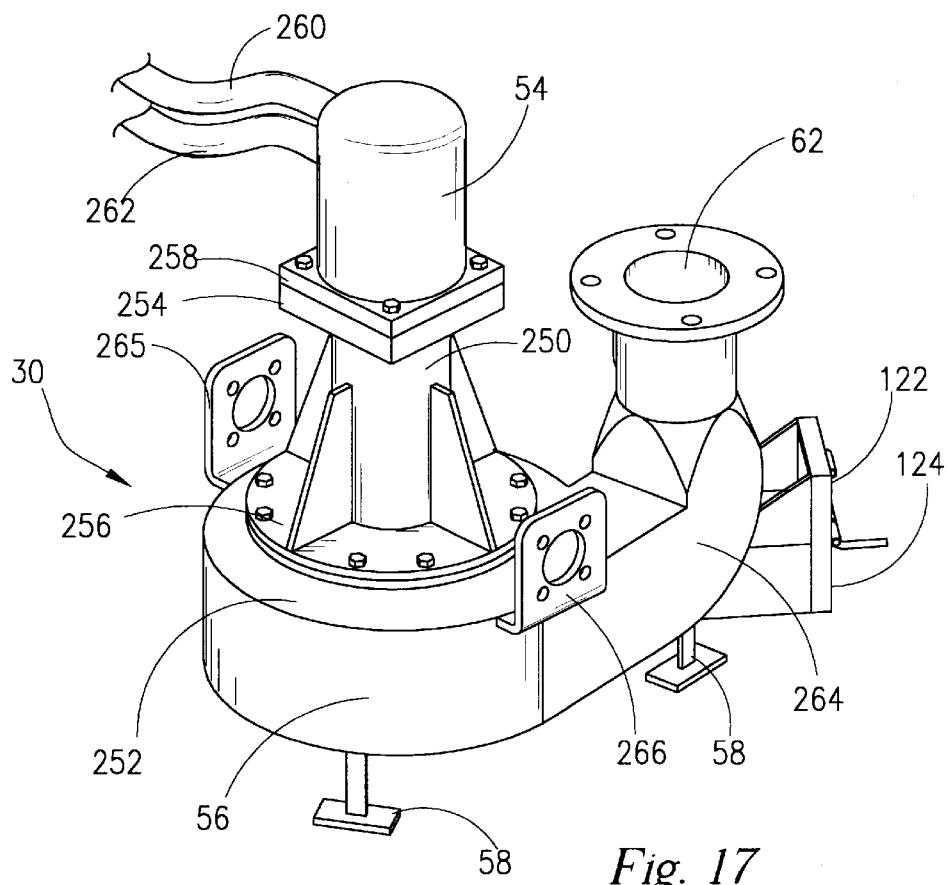
FIG. 17 is a perspective view of the pump member of the preferred embodiment of the present application.

Referring now to FIG. 17, a perspective view of the preferred embodiment of the pump member 30 of this application will now be described. As depicted, the pump motor 54 is operatively associated with the impeller assembly 200. The pump motor 54 will be, in the preferred embodiment, a hydraulic motor commercially available from Commercial Sheering Pump Co. under the name Hydraulic Gear Pump. The shaft from the motor extends to the pump case cylinder 56, with the impeller 200 being encased within the said pump case cylinder 56. The shaft cover 250 extends from the motor 54 to the top 252 of the pump case cylinder 56. The cover 250 contains supports and a top flange 254 and a bottom flange 256, with the top flange 254 connected to the motor flange 258. The FIG. 17 depicts the input line 260 and output line 262 for hydraulic fluid input and output to the motor.

Figure 18:
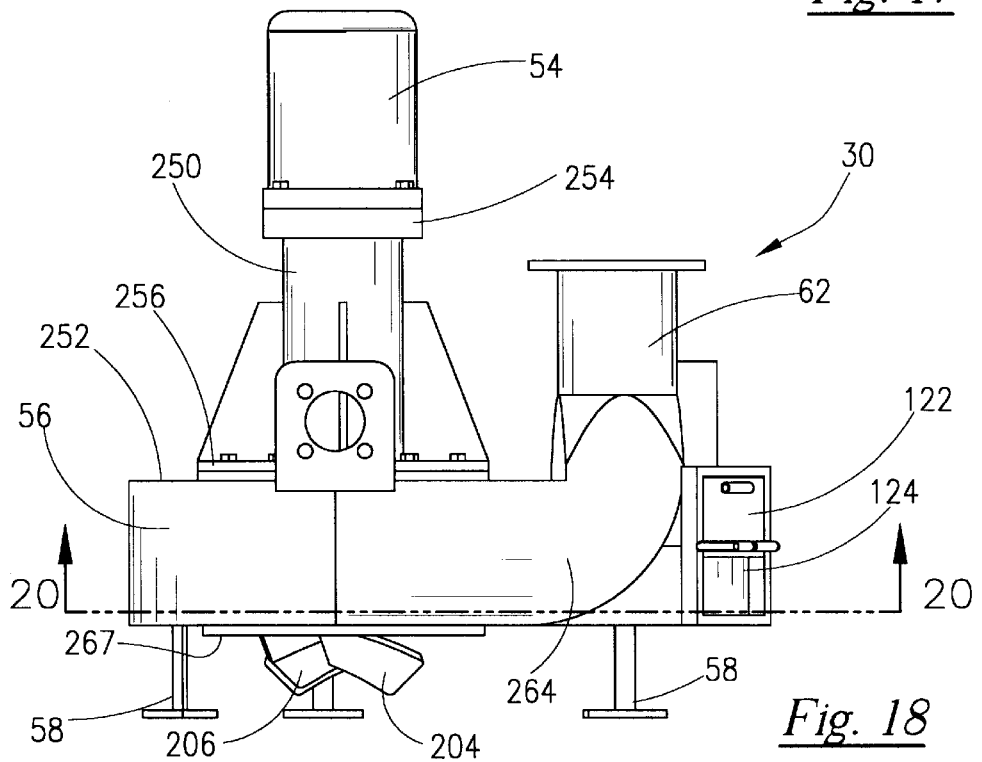
FIG. 18 is the front view of the pump member of FIG. 17.

Also depicted in FIG. 17 is the disposal conduit 62 that leads from the pump case 56. The pump case 56 will have an extension section 264 that stretches to the generally vertically oriented disposal conduit 62. The extension section 264 also extends to the slurry gate structure 122, with the slurry gate 122 containing the passage 124. It should also be noted that the FIG. 17 contains the brackets 265,266 for mounting hydraulic motor and cutter heads 150 as well as the legs 58. In FIG. 18, the pump means 30 is depicted in a side view. FIG. 18 depicts the impeller 200, and in particular, the protrusion of blade ends 212 and 214 from the pump case bottom 267.

Figure 19:
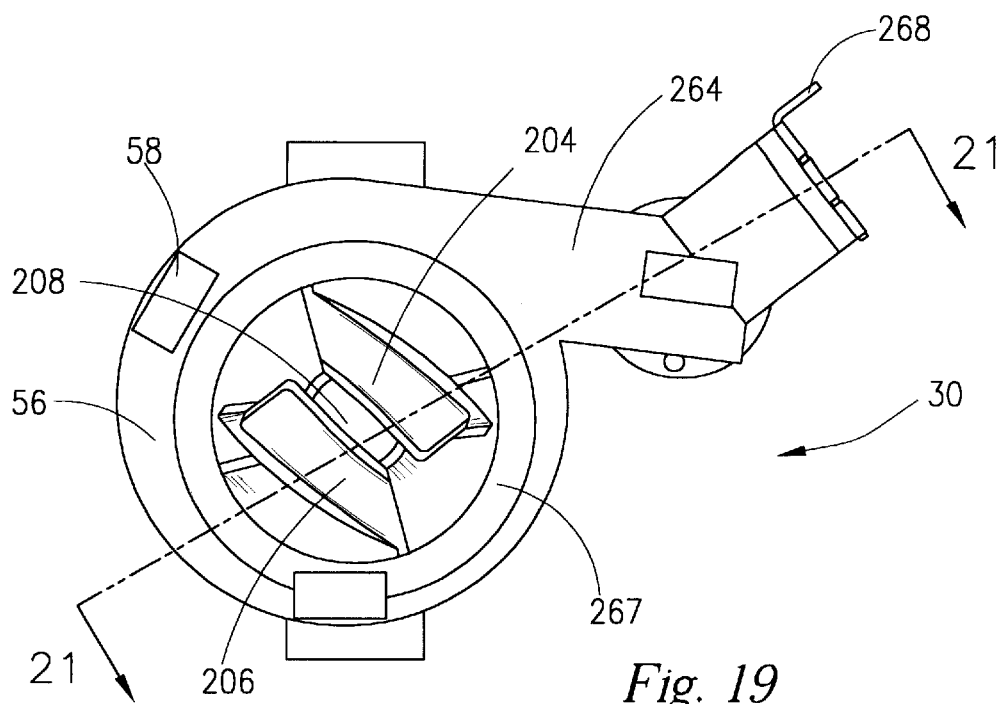
FIG. 19 is the underside view of the pump member of FIG. 17 depicting the impeller.
Figure 20:
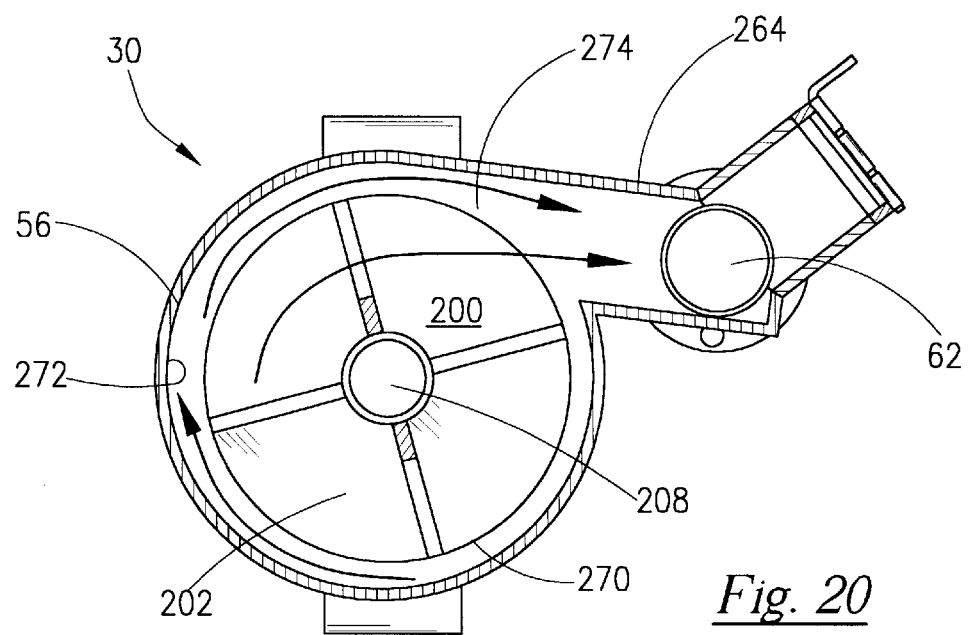
FIG. 20 is a cut through view of the preferred embodiment of the impeller within the pump case of FIG. 17.
Figure 21:
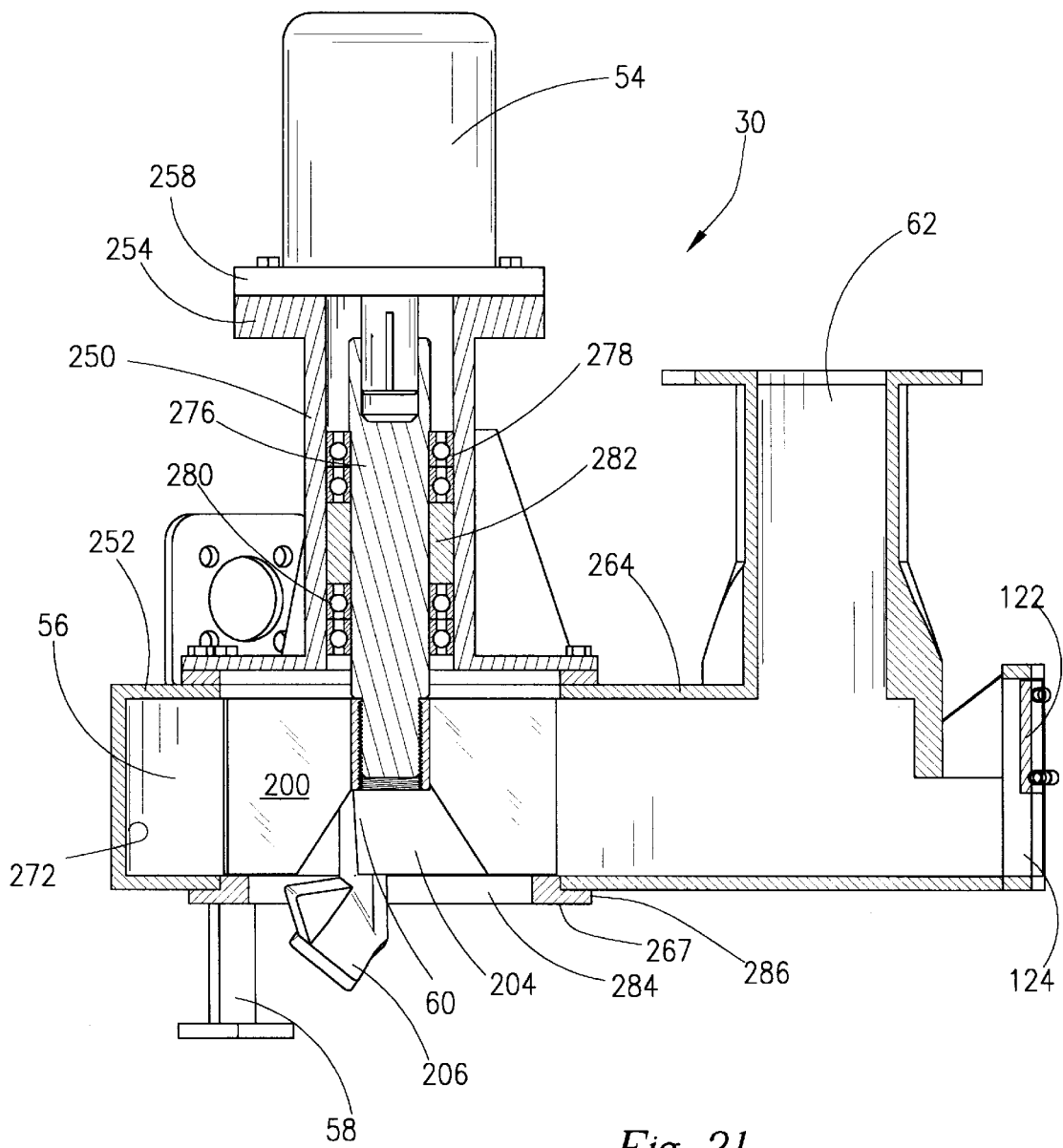
FIG. 21 is a cross-sectional view of the pump including the impeller of the preferred embodiment taken along line "21" of FIG. 19.

With respect to FIG. 19, the underside portion of the pump means 30 is illustrated. The impeller assembly 200 is shown projecting from the bottom of the pump case. Also, the FIG. 19 depicts the extension section 264 extending from the cylindrical pump case 56. The slurry gate 122 is also depicted. The slurry gate 122 will contain a rod 268 that can be used to position the gate in an open or closed position. The slurry gate may be configured as an inlet for the slurry into the pump member, or alternatively, as an outlet for the pump. As seen in FIGS. 19, 20, 21, the slurry gate 122 provides for an outlet once the gate is opened. In normal operation, the gate is closed.

FIG. 20 provides a cut-through view of the pump means 30. Thus, the impeller assembly 200, and in particular plate 202, is disposed within the pump case 56. The outer periphery 270 will be placed in relatively close relationship with the inner cylindrical wall 272 of the pump case 56. As previously described, the slurry will enter the pump case 56 from the center inlet area 208. Due to the design of the impeller, the slurry will be directed through the impeller assembly 200 and outward towards the inner wall 272 due to the centrifugal force generated by the rotation. The arrows 274 depicted the travel area of the slurry about the inner circular wall 272 to the extension section 264 which in turn will allow passage to the disposal conduit 62. The extension section 264 and the disposal conduit 62 are in fluid communication with one another as shown in FIG. 20. The slurry is then lifted to the surface in accordance with the teachings of the present invention.

FIG. 21 is a cross-sectional view of the pump means 30 taken along line "21—21" of FIG. 19. This view shows, in particular, the rotative shaft 276 that extends from the motor 54. Hence, the shaft cover 250 is generally a cylindrical member with an inner bore. The inner bore will have disposed therein the first set of roller bearings 278 and second set of roller bearings 280 that are separated by the spacer 282. The shaft 276 is threadedly connected to the impeller assembly 200 so that when the shaft 276 is rotated by the motor, the impeller assembly 200 and associated blades will likewise rotate thereby loading the pump case 56 with the slurry as previously described.

The FIG. 21 also depicts the generally circular opening 284, with the opening 284 being contained on the bottom 267 of the case 56. In the preferred embodiment, a wear plate 286 has been added which adds to the structure and reinforces the pump case 56 thereby protecting from the erosional forces produced during pumping. The slurry gate 124 is designed in this embodiment to be an outlet to the slurry. The operation of the pump depicted in FIGS. 17,18, 19,20, and 21 is similar to the operation previously described and is incorporated herein by reference thereto.

Figure 22:
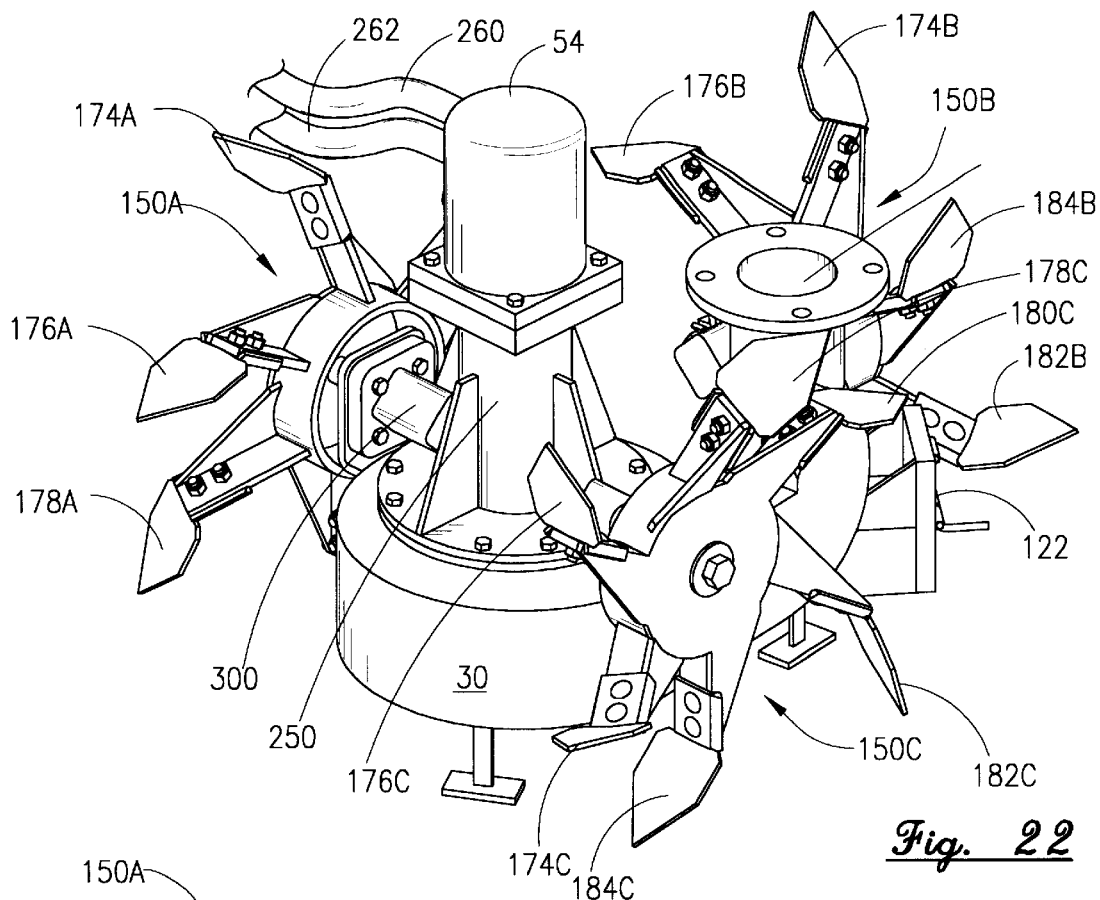
FIG. 22 is a perspective view of the fourth embodiment of this invention that includes a plurality of cutter heads mounted to a pump.

Referring now to FIG. 22, a perspective view of the fourth embodiment of this invention that includes a plurality of cutter heads operatively attached to a pump means will now be described. As mentioned earlier, like numbers appearing in the various figures refer to like components. This fourth embodiment includes a first cutter head 150a, a second cutter head 150b, and a third cutter head 150c that are attached to the pump means 30. The cutter head 150a contains the paddle heads 174a,176a,178a,180a,182a,184a. The cutter head 150b contains the paddle heads 174b, 176b, 178b, 180b, 182b, 184b. The cutter head 150c contains the paddle heads 174c,176c,178c,180c,182c,184c.

As shown in FIG. 22, the cutter head 150a is connected to the shaft cover 250 via the sub member 300. The sub member 300 also acts as the connection point for the hydraulic lines input/output that will be explained in greater detail with reference to FIG. 23. Therefore, with the configuration of the multiple cutter heads 150a, 150b, 150c about the pump means 30, the cutter heads 150a,b,c may act to cut, shred, agitate and channel the slurry downward to the pump inlet area 208.

Figure 23:
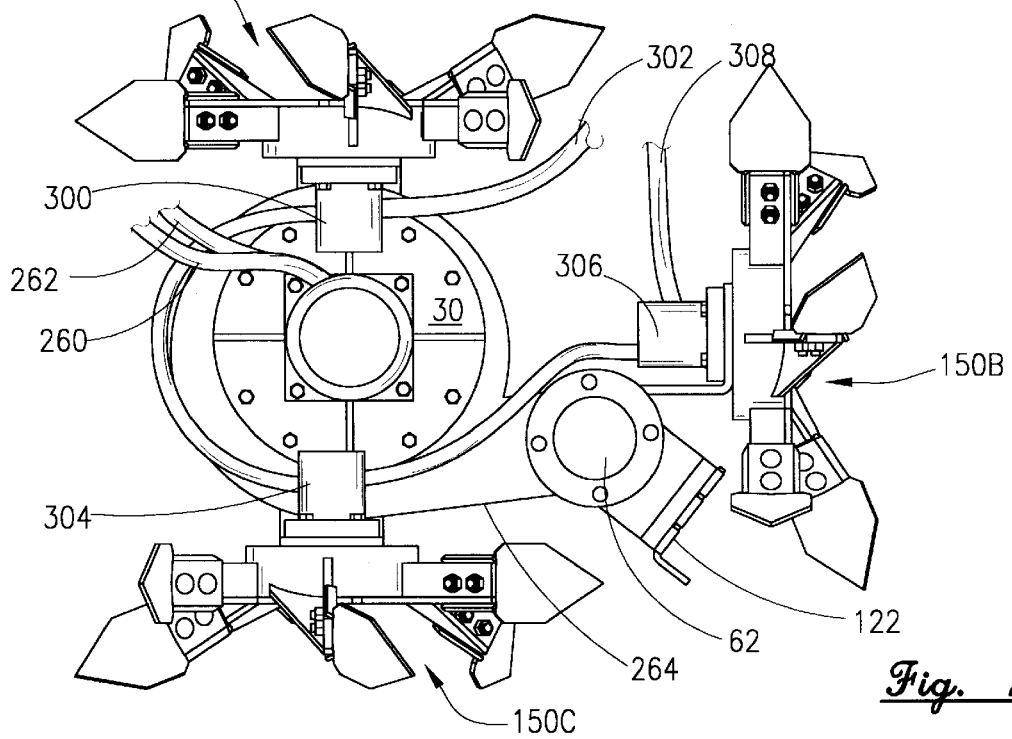
FIG. 23 is a top view of the embodiment of FIG. 22.

With reference to FIG. 23, the top view of the embodiment of FIG. 22 will now be described. The FIG. 23 depicts the cutter heads 150a, 150b, and 150c disposed about the pump means 30. The hydraulic line 302 has also been included that allows for the communication of the hydraulic fluid to the cutter heads 150a,150b,150c. Thus, the hydraulic line 302 is connected to the connection sub which in turn is connected to the connection sub 304 which in turn is connected to the connection sub 306. A return line 308 returns the hydraulic fluid to the supply source as is well understood by those of ordinary skill in the art. The connection subs 300, 304 and 306 allow conversion of the hydraulic fluid pressure force into a rotation force to a shaft that will in turn rotate the base 152 of the cutter heads 150a,b,c. Therefore, with the configuration depicted in FIGS. 22 and 23, multiple cutter heads are mounted about the pump means 30. While three cutter heads 150a,b,c have been shown, the nature of the slurry may dictate only one cutter head, or alteratively, only two cutter heads disposed about the pump case 56.

Changes and modifications in the specifically described embodiments can be carried out without departing from the scope of the invention which is intended to be limited only by the scope of the appended claims.

I claim:

1. A system for handling a waste material comprising:
    a tank containing the waste material;
    a handling member extending into said tank, said handling member having a pump member attached to a first end;
    a first process device attached to said pump member, said first process device comprising a first base having a first blade member extending radially therefrom; and wherein said first blade member is adapted to channel said waste material downward;
    and wherein said pump member contains an inlet and an outlet, a first rotor blade and a second rotor blade positioned for loading said pump member within a pump case, said first rotor blade and said second rotor blade comprising a first and a second vertically oriented plate member, with said first and said second plate member having a concave surface forming a scoop thereon adapted to deliver said waste material into the pump member inlet; and
    a motor operatively associated with said pump member so that said first rotor blade and said second rotor blade are rotated within said pump case.

2. the system of claim 1 further comprising a second process device attached to said pump member, said second process device comprising a second base having a second blade member extending radially therefrom: and wherein said second blade member is adapted to channel said waste material downward.

3. The system of claim 1 wherein said base contains a second blade member extending radially therefrom and wherein said second blade member is oriented in a plane opposite said first blade member so that said second blade member is adapted to channel said waste material downward.

4. The system of claim 3 wherein said first rotor blade and said second rotor blade are oriented in opposite planes about said pump member inlet; and wherein the system further comprises a third flat plate and a fourth flat plate oriented in opposite planes.

5. The system of claim 4 wherein said first process device further comprises a third blade member and a fourth blade member extending at an angular inclination from said base so that said third blade member and said fourth blade member are adapted to channel said waste material downward; and wherein said angular inclination is at least 10 degrees.

6. The system of claim 5 further comprising:
    a reciprocating carriage operatively associated with said tank, said reciprocating carriage having attached thereto said handling member and wherein said reciprocating carriage is adapted for a lateral movement on said tank.

7. The system of claim 6 wherein said first blade member, said second blade member, said third blade member and said fourth blade member of said first process device comprises:
    a shaft having a first end and a second end, and wherein said first end is connected to said base, and said second end is connected to a paddle head.

8. The system of claim 7 wherein said paddle head is offset relative to said shaft at an angle of deflection of at least 90 degrees.

9. A process for handling a drilling fluid waste from an oil and gas well bore comprising:
    placing the drilling fluid waste within an apparatus for handling the drilling fluid waste, the apparatus comprising: a tank containing said drilling fluid waste; a reciprocating carriage operatively associated with said tank, said reciprocating carriage having a handling member adapted thereto, with a pump means, operatively associated with said handling member, for pumping the drilling fluid waste from said tank; and wherein a first end of said handling member is pivotly attached to said reciprocating carriage, and a second end of said handling member has disposed therewith a process device orientated in a first plane, said process device comprising a base having a first blade and a second blade extending radially therefrom;
    transporting the carriage from a first position to a second position;
    rotating said base of said process device;
    directing said drilling fluid waste downward with said first blade, wherein said first blade includes a shaft with a paddle head attached thereto;
    directing said drilling fluid waste downward with said second blade, wherein said second blade includes a shaft with a paddle head attached thereto;
    rotating an impeller operatively formed within said pump means, said impeller containing a first rotor blade and a second rotor blade positioned for loading said pump means, said first rotor blade and said second rotor blade comprising a first vertically oriented and a second vertically oriented plate, with said first plate and said second plate having a concave surface forming a scoop thereon adapted to deliver said waste material into a pump inlet;
    pumping the drilling fluid waste from the tank;
    terminating the pumping;
    allowing the drilling fluid waste to separate into a solid phase and into a liquid phase;
    transporting the carriage from the second position to a third position
    removing the solid phase from said tank with said pump means.

10. The process of claim 9 wherein said apparatus further comprises a means for pivoting said handling member from a first location to a second location, and wherein the process further comprises:

pivoting said handling member from the first location to the second location.

11. The process of claim 10 further comprising:

transporting said carriage from a first side of said tank to a second side of said tank so that the solid phase is pushed to the second side of said tank;

removing the solid phase from said tank with said pump means.

12. The process of claim 11 wherein said impeller comprises a plurality of impeller blades and wherein said impeller blades contain a concave surface which forms a series of scoops on said impeller blades, said series of scoops being radially adjacent an inlet to said pump means and wherein the process further comprises:

rotating said plurality of impeller blades;

accumulating said drilling fluid waste within said plurality of scoops;

loading said drilling fluid waste into said inlet of said pump means.

13. An apparatus for handling a waste material comprising:

a vessel containing the waste material;

a trolley operatively associated with said rail, said trolley having a reciprocating handling member associated therewith;

a motor operatively associated with said handling member so that said handling member may be pivoted within said tank;

a cutter head rotatably attached to said handling member, said cutter head comprising a base attached to said handling member, said cutter head having a first blade member extending radially from said base; and wherein said first blade member is adapted to channel said waste material downward;

a pump, operatively associated with said handling member, adapted for receiving the waste material from said cutter head and pumping said waste material from said vessel, said pump including: an impeller assembly contained within a pump case, and wherein said impeller assembly contains a concave surface which forms a scoop on said impeller assembly, said scoop being radially adjacent an inlet to said pump and configured to deliver said waste material to said inlet.

14. The apparatus of claim 13 wherein said first blade member further comprises:

a shaft having a first end attached to said base and a second end containing a paddle, with said paddle being offset relative to said shaft at an angle of deflection of 90 degrees.

15. The apparatus of claim 14 wherein said cutter head contains a second blade member that extends radially from said base; and wherein said second blade member is adapted to channel said waste material downward; and wherein said second blade member further comprises:

a shaft having a first end attached to said base and a second end containing a paddle, with said paddle being offset relative to said shaft at an angle of deflection of 90 degrees.

* * * * *